United States Patent
Honig et al.

(10) Patent No.: US 12,339,156 B2
(45) Date of Patent: *Jun. 24, 2025

(54) TRUCK SCALE MANAGEMENT SYSTEM AND METHOD

(71) Applicant: TruckPay Inc., Tenafly, NJ (US)

(72) Inventors: Barry Scott Honig, Tenafly, NJ (US); Benjamin Martin Honig, Tenafly, NJ (US)

(73) Assignee: TruckPay Inc., Tenafly, NJ (US)

(*) Notice: Subject to any disclaimer, the term of this patent is extended or adjusted under 35 U.S.C. 154(b) by 149 days.

This patent is subject to a terminal disclaimer.

(21) Appl. No.: 17/888,765

(22) Filed: Aug. 16, 2022

(65) Prior Publication Data

US 2023/0019399 A1    Jan. 19, 2023

Related U.S. Application Data

(63) Continuation of application No. 17/673,057, filed on Feb. 16, 2022, now Pat. No. 11,448,546, which is a
(Continued)

(51) Int. Cl.
| | |
|---|---|
| G06Q 10/10 | (2023.01) |
| G01G 19/02 | (2006.01) |
| G06Q 10/06 | (2023.01) |
| G06Q 20/18 | (2012.01) |
| G06Q 30/018 | (2023.01) |
| G06Q 30/02 | (2023.01) |
| G06Q 30/06 | (2023.01) |
| G06Q 50/18 | (2012.01) |

(52) U.S. Cl.
CPC ............ *G01G 19/02* (2013.01); *G06Q 20/18* (2013.01); *G06Q 30/018* (2013.01); *G06Q 30/0281* (2013.01); *G06Q 50/18* (2013.01)

(58) Field of Classification Search
CPC ...... G01G 19/02; G06Q 20/18; G06Q 30/018; G06Q 30/0281; G06Q 50/18
USPC .......................................... 705/1.1, 317, 346
See application file for complete search history.

(56) References Cited

U.S. PATENT DOCUMENTS

| | | | |
|---|---|---|---|
| 6,578,925 B1 | 6/2003 | Baker | |
| 6,863,351 B2 | 3/2005 | Baker | |

(Continued)

FOREIGN PATENT DOCUMENTS

WO   WO-2015052662 A1 * 4/2015 ........... G01G 19/024

*Primary Examiner* — Jonathan P Ouellette

(74) *Attorney, Agent, or Firm* — Meister Seelig & Fein PLLC

(57) ABSTRACT

A truck scale management system comprising a server including a processor and a memory having executable instructions stored thereon that when executed by the processor cause the processor to connect to a truck scale system through a communication interface via a virtual scale, the virtual scale comprising a data connection to a physical truck scale in the truck scale system and including attributes of the physical truck scale, retrieve a given virtual kiosk associated with the virtual scale from a database, the given virtual kiosk communicatively accessible from a client device and including one or more customizable functionalities and workflows that interact with the truck scale system, and facilitate communication between the client device and the truck scale system via the given virtual kiosk.

20 Claims, 41 Drawing Sheets

Related U.S. Application Data continuation-in-part of application No. 16/839,768, filed on Apr. 3, 2020, now Pat. No. 11,287,304, which is a continuation of application No. 16/451,482, filed on Jun. 25, 2019, now Pat. No. 10,634,547.

(60) Provisional application No. 62/862,800, filed on Jun. 18, 2019.

(56) References Cited

U.S. PATENT DOCUMENTS

| | | | |
|---|---|---|---|
| 7,432,456 B2 * | 10/2008 | LaFollette | G01G 19/02 177/133 |
| 9,411,337 B1 | 8/2016 | Theobald | |
| 9,575,492 B1 | 2/2017 | Theobald | |
| 9,623,553 B1 | 4/2017 | Theobald | |
| 10,048,697 B1 | 8/2018 | Theobald | |
| 10,108,185 B1 | 10/2018 | Theobald | |
| 10,171,775 B1 | 1/2019 | Theobald | |
| 10,222,798 B1 | 3/2019 | Brady | |
| 10,245,937 B2 | 4/2019 | Gillett | |
| 10,252,659 B2 | 4/2019 | Healey | |
| 10,437,255 B1 | 10/2019 | Theobald | |
| 10,538,421 B2 | 1/2020 | Blevins | |
| 10,560,665 B1 | 2/2020 | Theobald | |
| 10,755,581 B2 | 8/2020 | de Moura | |
| 11,006,079 B2 | 5/2021 | Theobald | |
| 11,029,696 B2 | 6/2021 | Wu | |
| 11,086,328 B2 | 8/2021 | Keivan | |
| 11,137,772 B2 | 10/2021 | Theobald | |
| 11,163,305 B2 | 11/2021 | Healey | |
| 11,263,838 B2 | 3/2022 | Patnaik | |
| 11,325,253 B2 | 5/2022 | Theobald | |
| 11,360,478 B2 | 6/2022 | Howey | |
| 11,429,099 B2 | 8/2022 | Smith | |
| 11,441,937 B2 | 9/2022 | Zhang | |
| 2003/0193234 A1 | 10/2003 | Baker | |
| 2017/0190335 A1 | 7/2017 | Gillett | |
| 2018/0158340 A1 | 6/2018 | de Moura | |
| 2018/0281657 A1 | 10/2018 | Healey | |
| 2018/0319594 A1 | 11/2018 | Blevins | |
| 2019/0049291 A1 * | 2/2019 | Rasen | G07G 1/0072 |
| 2019/0137991 A1 | 5/2019 | Agarwal | |
| 2019/0179329 A1 | 6/2019 | Keivan | |
| 2019/0258251 A1 | 8/2019 | Ditty | |
| 2019/0302764 A1 | 10/2019 | Smith | |
| 2019/0322319 A1 | 10/2019 | Smith | |
| 2020/0004248 A1 | 1/2020 | Healey | |
| 2020/0041329 A1 * | 2/2020 | Shike | E02F 9/2054 |
| 2020/0150656 A1 | 5/2020 | Lacaze | |
| 2020/0174479 A1 | 6/2020 | Howey | |
| 2020/0180924 A1 | 6/2020 | Lacaze | |
| 2020/0225675 A1 | 7/2020 | Lacaze | |
| 2021/0034847 A1 | 2/2021 | Lacaze | |
| 2021/0053407 A1 | 2/2021 | Smith | |
| 2021/0101745 A1 | 4/2021 | Cruz | |
| 2021/0183186 A1 * | 6/2021 | Patnaik | G01G 19/02 |
| 2021/0197852 A1 | 7/2021 | Fairfield | |
| 2021/0229668 A1 | 7/2021 | Jing | |
| 2021/0239515 A1 * | 8/2021 | Valdemarsson | G08G 1/052 |
| 2021/0406810 A1 * | 12/2021 | Hou | G06Q 10/083 |
| 2022/0027852 A1 | 1/2022 | Healey | |
| 2022/0028191 A1 * | 1/2022 | Patnaik | G07C 5/0825 |
| 2022/0207936 A1 * | 6/2022 | Patnaik | G05D 1/0212 |
| 2022/0212887 A1 | 7/2022 | Zhang | |

* cited by examiner

Port 1 Name

Steer Weight

Port 1 SSID –
Same as Scale 192.1.1.16

Port 1 Number

6001

Port 1 String Notation

Condec Continuous String

Number of Sections

Section 1 Type

String

String

Section 1 Type

Variable Number

Representation

Steer Weight

Min Length

5

Max Length

8

SAVE

Fig. 18

Bens Kiosk P2W
Pay to weigh

Payments

Type
Pay-to-Weigh

Cost ($)
9.6

Billing

Type
Credit/ Debit Card

Weigh

Weighing Method
Gross Only

Units
Pounds

Material Destination   Insurance Provider   Truck Information

Add New Kiosk

Name: My kiosk

Description: This is my kiosk

Payment Type: Company Owned

Starting Ticket Number: 1

Weighing Method: Inbound-Outbound

Weight Units: kg

Single-Login Mode ☐

Unlimited Pre-Ticket Weighment ☑

SAVE

Fig. 34

< Back

Overview

Weight Info

| | |
|---|---|
| Gross Weight | 00 lb |
| Tare Weight | 00 lb |
| Net Weight | 00 lb |
| Inbound Weight | 10580 lb |
| Outbound Weight | 00 lb |
| Date | January 10, 2022 |
| Time | 3:23 PM |

Finish

Fig. 41

Success!

Gross Weight  Tare Weight
0 lb  0 lb

Net Weight
0 lb

Inbound Weight  Outbound Weight
10580 lb  0 lb

[ Finish ]

Fig. 42

< Back

Overview

Weight Info

| | |
|---|---|
| Gross Weight | 10580 lb |
| Tare Weight | 8460 lb |
| Net Weight | 2120 lb |
| Inbound Weight | 10580 lb |
| Outbound Weight | 8460 lb |
| Date | January 10, 2022 |
| Time | 3:24 PM |

TRUCK SCALE MANAGEMENT SYSTEM AND METHOD

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATIONS

This application is a continuation of U.S. patent application Ser. No. 17/673,057 filed on Feb. 16, 2022 (now U.S. Pat. No. 11,448,546 issued on Sep. 20, 2022), entitled "TRUCK SCALE MANAGEMENT SYSTEM AND METHOD," which is a continuation-in-part of U.S. patent application Ser. No. 16/839,768 filed on Apr. 3, 2020 (now U.S. Pat. No. 11,287,304 issued on Mar. 29, 2022), entitled "TRUCK SCALE MANAGEMENT SYSTEM AND METHOD," which is a continuation of U.S. patent application Ser. No. 16/451,482 filed on Jun. 25, 2019 (now U.S. Pat. No. 10,634,547 issued on Apr. 28, 2020), entitled "TRUCK SCALE MANAGEMENT SYSTEM AND METHOD," which claims the priority of U.S. Provisional Application No. 62/862,800 filed on Jun. 18, 2019, entitled "TRUCK SCALE MANAGEMENT SYSTEM AND METHOD," the disclosures of which are hereby incorporated by reference in their entirety.

BACKGROUND OF THE INVENTION

Field of the Invention

This application generally relates to electronic scales for weighing of heavy-duty trucks, and in particular, to scales with customizable web-based kiosk interfaces.

Description of the Related Art

Heavy duty truck scales are well known in the art. A truck scale can be used to check individual axle weights and gross vehicle weights to determine whether the vehicle is safe to travel on public roads or bridges without being stopped and fined by the authorities for being overloaded. A truck scale can also be used to check axle weights and gross vehicle weights to determine the weight of a load or amount of good being transported. By weighing the vehicle both empty and when loaded, the load carried by the vehicle can be calculated. Truck scales are used in industries that manufacture or move bulk items, such as in mines or quarries, garbage dumps/recycling centers, bulk liquid and powder movement, household goods, and electrical equipment. Since the weight of the vehicle carrying the goods is known (and can be ascertained quickly if it is not known by weighing the empty vehicle) they are a quick and easy way to measure the flow of bulk goods in and out of different locations.

Kiosk systems may be used with truck scales to manage the flow of trucks in and out of sites, such as a plant or facility. Kiosk devices can either be mounted inside a scale house or outside on a post or pedestal near the truck scale. The kiosk system may facilitate vehicle identification, capturing truck weight, and loading on site. A kiosk may comprise a data collection system that is designed specifically for those sites. As such, these kiosks can integrate with a facility's central office and accounting systems.

However, existing kiosk systems lack ease and versatility for upgrades and features that can be customized without the need of servicing technicians. There is thus a need for a truck scale kiosk system with improved scalability and customization for scale owners and drivers.

SUMMARY OF THE INVENTION

The present invention provides a truck scale management system and method. According to one embodiment, the truck scale management system comprises a server including a processor and a memory having executable instructions stored thereon that when executed by the processor cause the processor to connect to a truck scale system through a communication interface via at least one virtual scale. The truck scale system comprises at least one physical truck scale. A first of the at least one virtual scale comprises a data connection to the at least one physical truck scale, wherein the first virtual scale includes attributes of the at least one physical truck scale and wherein the first virtual scale defines weighing capability, behavior of the at least one physical truck scale, and formatting of data streams transmitted from the at least one physical truck scale. The processor is further configured to retrieve, in response to a request from a client device, a virtual kiosk from a database. The virtual kiosk is associated with the first virtual scale and is communicatively accessible by the client device. The virtual kiosk is configured to execute weighment operations through the first virtual scale, receive data streams associated with the weighment operations from the at least one physical truck scale, and parse the data streams according to the formatting for display on the client device. The processor is further configured to cause the virtual kiosk to be loaded onto the client device and facilitate communication between the client device and the truck scale system via the virtual kiosk.

The first virtual scale may include an axle specification that specifies a number of ports and a default weight unit. The axle specification may specify a number of data streams sent by the at least one physical truck scale and ports corresponding to the data streams. The axle specification may also specify which of steer, drive, trailer, and total weight streams correspond to the ports.

The data streams may include one or more parts of a string corresponding to weight data, weight units data, and a motion flag. The data streams may include a string representative of axle weights comprising at least one of a steer weight, a drive weight, and a trailer weight. The formatting of the data streams may comprise a string notation including a plurality of sections. The plurality of sections may be configured in string, set, variable number, or fixed number formats.

The weighment operations may also include unlimited pre-ticketed re-weighments. In one embodiment, the virtual kiosk may further comprise a payable kiosk configured to receive a list of materials, prices associated with receiving the materials, and weight units for the materials and generate a price to be paid for receiving the materials. In another embodiment, the virtual kiosk may further comprise a receivable kiosk configured to receive a list of materials, prices associated with dumping the materials, and weight units for the materials and generate a price to be paid for dumping the materials. The processor may be further configured to connect to the truck scale system through an application programming interface from a self-driving or remotely controlled vehicle.

According to one embodiment, the method comprises connecting to a truck scale system through a communication interface via at least one virtual scale. The truck scale system comprises at least one physical truck scale. A first of the at least one virtual scale comprises a data connection to the at least one physical truck scale. The first virtual scale includes attributes of the at least one physical truck scale and defines weighing capability, behavior of the at least one physical truck scale, and formatting of data streams transmitted from the at least one physical truck scale. The method further comprises retrieving, in response to a request from a client device, a virtual kiosk from a database. The virtual kiosk is associated with the first virtual scale and is communicatively accessible by the client device. The virtual kiosk is configured to execute weighment operations through the first virtual scale, receive data streams associated with the weighment operations from the at least one physical truck scale, and parse the data streams according to the formatting for display on the client device. The method further comprises causing the virtual kiosk to be loaded onto the client device and facilitating communication between the client device and the truck scale system via the virtual kiosk.

The data streams may include one or more parts of a string corresponding to weight data, weight units data, and a motion flag. The data streams may also include a string representative of axle weights comprising at least one of a steer weight, a drive weight, and a trailer weight. The formatting of the data streams may comprise a string notation including a plurality of sections. The plurality of sections may be configured in string, set, variable number, or fixed number formats.

The weighment operations may include unlimited pre-ticketed re-weighments. In one embodiment, the virtual kiosk may further comprise a payable kiosk configured to receive a list of materials, prices associated with receiving the materials, and weight units for the materials and generate a price to be paid for receiving the materials. In another embodiment, the virtual kiosk may further comprise a receivable kiosk configured to receive a list of materials, prices associated with dumping the materials, and weight units for the materials and generate a price to be paid for dumping the materials. The method may further comprise connecting to the truck scale system through an application programming interface from a self-driving or remotely controlled vehicle.

According to another embodiment, the truck scale management system comprises a server including a processor and a memory having executable instructions stored thereon that when executed by the processor cause the processor to connect to a truck scale system through a communication interface via at least one virtual scale. The truck scale system comprises at least one physical truck scale. A first of the at least one virtual scale comprises a data connection to the at least one physical truck scale. The first virtual scale includes attributes of the at least one physical truck scale and defines weighing capability, behavior of the at least one physical truck scale, and formatting of data streams transmitted from the at least one physical truck scale. The processor is further configured to retrieve, in response to a request from a tablet kiosk device, a virtual tablet kiosk from a database. The virtual tablet kiosk is associated with the first virtual scale and is communicatively accessible by the tablet kiosk device via a single login mode using messaging communication. The virtual kiosk is configured to execute weighment operations through the first virtual scale based on messaging communication information, receive data streams associated with the weighment operations from the at least one physical truck scale, parse the data streams according to the formatting for display on the tablet kiosk device, and send weighment tickets using the messaging communication information. The processor is further configured to cause the virtual tablet kiosk to be loaded onto the tablet kiosk device and facilitate communication between the tablet kiosk device and the truck scale system via the virtual tablet kiosk.

The weighment operations may include tracking a weighment ticket and directing weighment flow for a user of the virtual tablet kiosk for one or more weighing methods. The virtual kiosk may be further configured for inbound/outbound weighing.

BRIEF DESCRIPTION OF THE DRAWINGS

The invention is illustrated in the figures of the accompanying drawings which are meant to be exemplary and not limiting, in which like references are intended to refer to like or corresponding parts.

FIGS. 8 through 18 illustrate exemplary interfaces for specifying streams for scales according to an embodiment of the present invention.

FIGS. 19 through 26 illustrate exemplary screen interfaces for configuring virtual scales and kiosks in a truck scale management system according to an embodiment of the present invention.

FIG. 34 illustrates an exemplary interface for adding a new virtual kiosk for a virtual scale according to an embodiment of the present invention.

FIGS. 35 through 46 illustrate exemplary screen interfaces for inbound/outbound weighing according to an embodiment of the present invention.

DETAILED DESCRIPTION OF THE INVENTION

Figure 1:
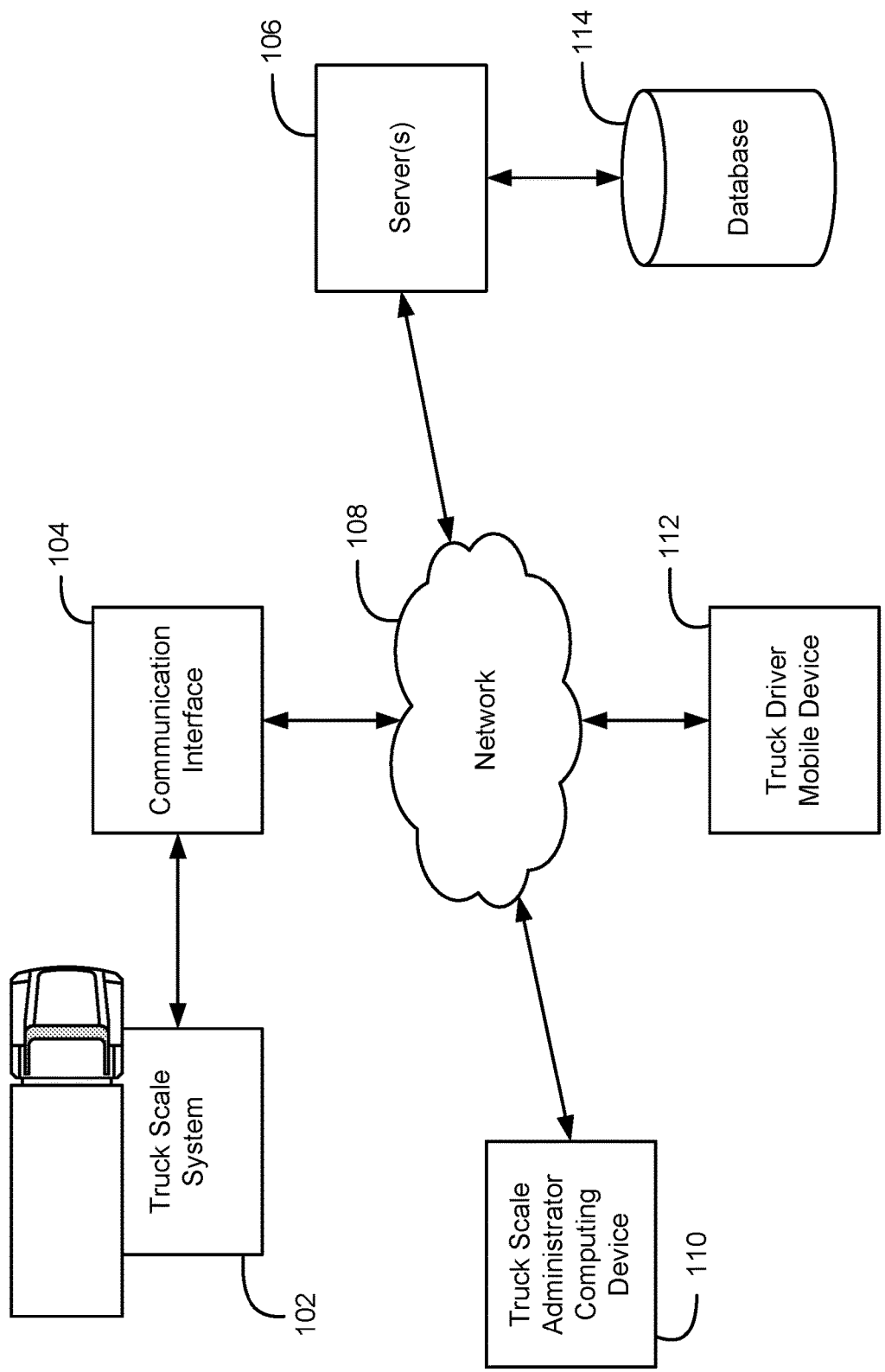
FIG. 1 illustrates a computing system according to an embodiment of the present invention.

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

The present application discloses a truck scale management system that provides web-accessible kiosk interfaces to truck scales. The truck scale management system may include a platform for creating and editing virtual kiosks that associate functionalities and workflow with truck scales. A virtual kiosk may comprise software associated with a scale for logistics, weighing method (e.g., tare then gross weight ("TG"), gross then tare weight ("GT"), tare weight only ("TO"), or gross weight only ("GO"), re-weighment), payments, and billing that can be customized to meet the need of a specific customer by defining entries in specific tables in a database. The virtual kiosk may also be configured for inbound/outbound weighing such that a driver user can specify whether a truck is inbound or outbound or be determined based on inbound and outbound weights. For example, the virtual kiosk may determine a tare weight and a gross weight from truck weighings. Specifically, the lower of the two weights may be determined as the tare weight and the higher may be the gross weight. The virtual kiosk may also then determine a net weight (e.g., of a cargo load) based on a difference of the inbound and outbound weights.

The platform may allow customers to specify the type of data that they want their software-defined kiosks to collect and how they want to subsequently access that data for further analysis. A given virtual kiosk may be associated with a particular scale or a scale management system. Additionally, multiple virtual kiosks, that perform different functions, may also be connected to the same scale. In another embodiment, multiple scales may be allowed to share the functionality of multiple virtual kiosks. The disclosed system is also applicable to any scale that streams a weight over an electronic indicator, such as a food scale in a food processing factory, etc., and where the information from the scale is recorded electronically along with other related information.

The platform may include a web interface that provide scale owners with administrative capabilities to create and modify virtual scales and associated kiosks. Scale-owners and trucking companies, as well as drivers, may create accounts and view weighment reports. In one embodiment, client devices such as smart phones may be used by drivers to connect to and interact with scales. A security layer may be established where drivers can login to use particular scales.

The disclosed system may increase flexibility with re-provisioning, adding, or expanding kiosk/scale features. The system's device and location independence enables users to access a kiosk and scale using a web application or browser regardless of their location or what device they use (e.g., PC, mobile device). As kiosk and scale interfaces are off-site and accessed via a network, such as the Internet, users can connect to the kiosk and scale from anywhere. As such, the presently disclosed system provides flexibility of being able to change the virtual kiosk in real-time and being able to attach any number of virtual kiosks to a given scale at a time.

FIG. 1 illustrates a computing system according to an embodiment of the present invention. The system presented in FIG. 1 includes truck scale system 102, communication interface 104, server(s) 106, network 108, truck scale administrator computing device 110, and truck driver device 112. Truck scale system 102 may comprise structures and devices that are integrated with a weighing apparatus that can measure a weight of a rail or road vehicle and their contents by truck, axle, or load. Exemplary weighting apparatuses of the disclosed system include weighbridges, onboard truck weighing systems, axles scales, and wheel weighing pads. The truck scale system 102 may include electronic components such as a load cell including a transducer that converts an analog signal into a digital weight readout.

The truck scale system 102 may be configured with or connected to a communication interface 104. A truck scale management system comprising server(s) 106 may connect to communication interface 104 to establish communications over network 108. The communication interface 104 may comprise hardware and software including networking components, control systems, sensors, positioning systems, and wired/wireless connections that allow server(s) 106 to communicate with and control the truck scale system 102 in a variety of autonomous, semi-autonomous, or manual modes.

The truck scale system 102 operating in an autonomous manner may operate automatically based upon information provided by server(s) 106, without the need for human operator input. Further, the truck scale system 102 operating semi-autonomously may include an operator, either within a vicinity of the truck scale system 102 or remotely, who performs some tasks or provides some input while other tasks are performed automatically based upon instructions provided by the server(s) 106. That is, truck scale system 102 may be used for self-driving and remotely controlled trucks. The truck scale system 102 would then not be accessed by a truck driver but rather by an operator of a remote controlled truck or by others who are responsible or own the self-driving truck, or by the self-driving system on the truck itself.

Server(s) 106, as described herein, may vary widely in configuration or capabilities but are comprised of at least a special-purpose digital computing device including at least one or more central processing units and memory. The server(s) 106 may also include one or more of mass storage devices, power supplies, wired or wireless network interfaces, input/output interfaces, and operating systems, such as Windows Server, Mac OS X, Unix, Linux, FreeBSD, or the like. In an example embodiment, server(s) 106 may include or have access to memory for storing instructions or applications for the performance of various functions and a corresponding processor for executing stored instructions or applications. For example, the memory may store an instance of the server(s) 106 configured to operate in accordance with the disclosed embodiments.

According to another embodiment, server(s) 106 may comprise cloud computing data centers configured to provide client devices with access to an application, service, or platform. For example, Software-as-a Service ("SaaS") provides the capability to use a provider's applications running on a cloud infrastructure. The applications are accessible from various client devices through a thin client interface such as a web browser or an application. Cloud computing includes a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service.

Server(s) 106 may connect to truck scale system 102 through communication interface 104 using a virtual scale and communicate operating instructions to the truck scale system 102 based on software-defined kiosk workflow and information stored in database 114. The truck scale management system may include a platform for creating and editing virtual kiosks that associate functionalities and workflow with truck scale system 102. The platform may include a web interface that can be accessed over network 108 to provide administrative capabilities to truck scale administrator computing device 110 to create and modify scales and their associated kiosks.

The virtual kiosks may be accessed by and rendered on truck driver mobile device 112 through network 108 to utilize truck scale system 102. For example, a scale owner user (110) may sign on to server(s) 106 via a web portal to create and define a virtual scale. Virtual kiosks may be further controlled through an application programming interface ("API") from a self-driving or remotely controlled truck. As such, functionalities provided by truck scale system 102 may be accessed and utilized without any direct human interaction at a physical location associated with truck scale system 102.

A virtual scale may comprise a software representation of a physical truck scale, specifically, the virtual scale definition describes how the truck scale operates and includes a data connection to the physical scale. A virtual scale can have one or more virtual kiosks connected to it. Truck drivers (112) can connect to a scale's different virtual kiosks, depending upon how they need to use the scale and the types of authorization they have been given.

Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from devices may be encrypted using, for example, the Advanced Encryption Standard (AES) with a 128, 192, or 256-bit key size, or any other encryption standard known in the art.

Truck scale administrator computing device 110 may comprise computing devices (e.g., desktop computers, laptops, personal digital assistants (PDA), cellular phones, smartphones, tablet computers, or any computing device having a central processing unit and memory unit capable of connecting to a network). Truck driver mobile device 112 may comprise computing devices and vary in terms of capabilities or features, for example, a cell phone, a tablet computer, a laptop, and in-dash car computer, or the like. The truck driver mobile device 112 may comprise a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display.

Figure 2:
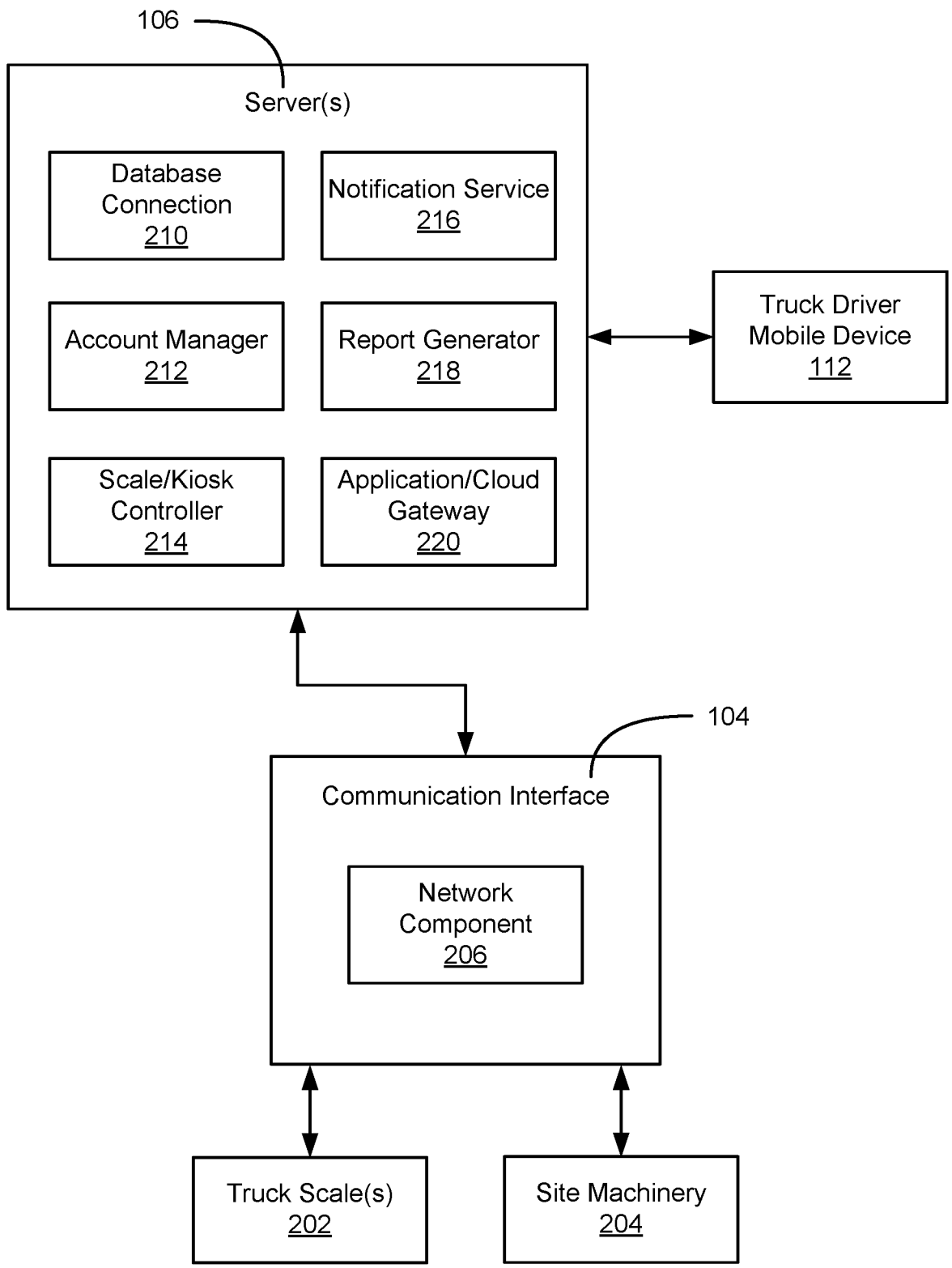
FIG. 2 illustrates a data flow diagram of a truck scale management system according to an embodiment of the present invention.

FIG. 2 presents a data flow diagram of a truck scale management system according to an embodiment of the present invention. A trucking site may include truck scale(s) 202 and site machinery 204. Truck scale(s) 202 may comprise one or more weighing apparatuses for measuring the weight of a truck and/or its load. Site machinery 204 may comprise equipment or hardware that are used in conjunction with truck scale(s) 202 such as automated equipment, sensors, and cameras for loading/unload, scanning, and signaling. Truck scale(s) 202 and/or site machinery 204 that may be Internet protocol (IP)-enabled devices connected to the truck scale(s) 202, such as sensors that indicate if a truck is fully on the truck scale(s) 202 may be operable by via virtual scale and kiosk interfaces that are provided by server(s) 106 to truck driver mobile device 112.

Server(s) 106 includes database connection 210, account manager 212, scale/kiosk controller 214, notification service 216, report generator 218, and application/cloud gateway 220. A virtual scale and kiosk may be retrieved by truck driver mobile device 112 by logging in or accessing an account with account manager 212. Application/cloud gateway 220 may comprise an intermediary that allows communication between server(s) 106 and truck driver mobile device 112. The application/cloud gateway 220 may provide high-level secure network system communication. For example, when truck driver mobile device 112 requests access to resources of server(s) 106 such as files, Web pages and databases, the truck driver mobile device may first connect with a proxy server, which then establishes a connection with the main server. Account manager 212 may save and load virtual scales and kiosks through database connection 210.

Scale/kiosk controller 214 may define and associate user interface controls with physical features of truck scale(s) 202 and site machinery 204. The scale/kiosk controller 214 may communicate with truck scale(s) 202 and/or site machinery 204 through communication interface 104. Communication interface 104 includes network component 206. The network component 206 may comprise network-related devices (e.g., communication devices, routers (e.g., wireline or wireless routers), switches, etc.). In some implementations, one or more network-related devices of the network component 206 can be connected to or interfaced with truck scale(s) 202 and site machinery 204 to facilitate collecting data (e.g., industrial-automation-system-related data) from the truck scale(s) 202 and site machinery 204 or communicating information (e.g., control signals, parameter data, configuration data, etc.) to the truck scale(s) 202 and site machinery 204.

Account manager 212 may also facilitate billing and payment functions associated with the usage of truck scale (s) 202. Report generator 218 may generate reports of activity, billings, payments, maintenance, and errors. Notification service 216 may generate alerts or messages to truck driver mobile device 112 and truck scale administrator computing device to report tickets, invoices, confirmations, reminders, warnings, and other system reports.

Figure 3:
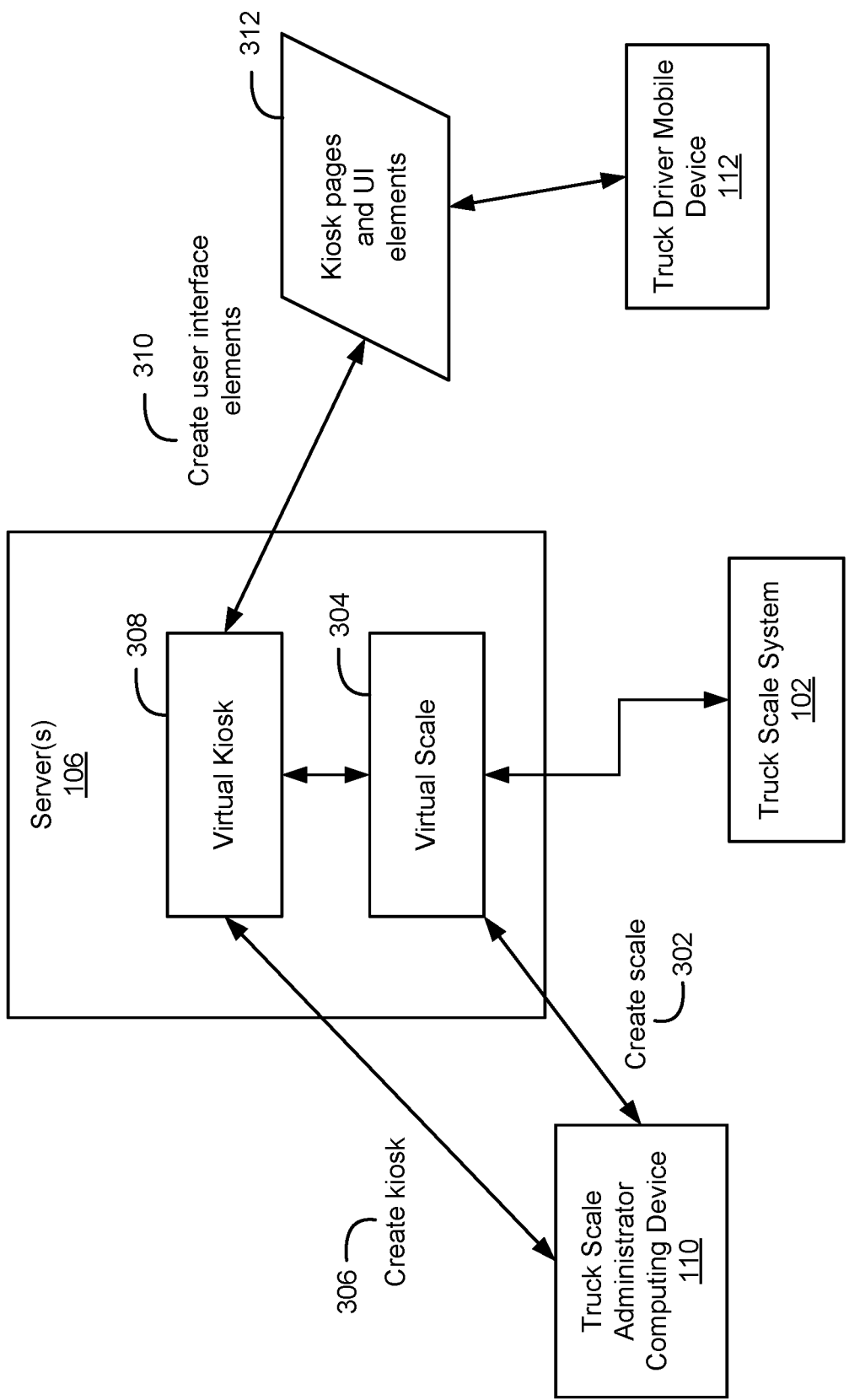
FIG. 3 presents a data flow diagram of a truck scale management system according to an embodiment of the present invention.

FIG. 3 presents a data flow diagram of a truck scale management system according to an embodiment of the present invention. A web interface may be provided by a truck scale management system on server(s) 106 for scale owners to create virtual scales and kiosks associated with the virtual scales. A truck scale administrator computing device 110 may access the truck scale management system to initialize a process (302) for creating a virtual scale 304. Virtual scale 304 may comprise a representation of a physical scale at truck scale system 102 that is defined with certain attributes. Attributes of virtual scale 304 may comprise hardware specifications of the scale including make and model number, scale type, weighing capability, behavior of the scale, a service set identifier (SSID), and a port number. In one embodiment, an administrative user may add scale definitions to a database table of the system where users may be able to select from when creating their own user defined scales. Virtual scale 304 may be created either manually or with the use of a template, or through an API.

Virtual scale 304 may also be associated with a company, for example, by linking the virtual scale to a name and location of the company. The location may include data that contains the latitude and longitude of the scale's location. For example, truck driver mobile device 112 using truck scale management system to weigh a truck may be presented with a scale having a location nearest to a current location of truck driver mobile device 112. According to one embodiment, the location of the company may also be linked to virtual scales for a plurality of locations for a pick-up and drop-off, e.g., the case of a haul-back job, where materials are picked up at one location, dropped at a second location, and then more material is picked up and brought back to either the original or a third location. The virtual scale 304 may also include a special code that an owner of the scale can specify to differentiate scales when multiple scales are present on a site. The special code can also be used to locate a scale, if for example, location services on truck driver mobile device 112 is not available.

According to one embodiment, the location data of the scale may be used to create a geo-fence that specifies a distance that the truck driver mobile device 112 can be away from the scale in order to make a valid connection. A pre-configured or user-specified distance and units of distance may be used to set the geo-fence. The default distance units may be configured for the country where the scale is located. If truck driver mobile device 112 is within the geo-fence of a scale, the truck driver mobile device 112 may attempt to connect to the scale and notify of a successful connection to the scale. Server(s) 106 or truck driver mobile device 112 may also not allow or lockout a mobile device of a driver (e.g., close enough to obviate the geo-fence) who is waiting on line to get on a scale until the scale becomes available.

Virtual scale 304 may include a virtual locking functionality to ensure that only one driver is able to communicate with a physical scale at a given time (e.g., weighing session). Specifically, when a current driver is on a given physical scale and has successfully connected to it, other drivers may be blocked from also connecting to the given physical scale so that other drivers are unable to communicate with the given physical scale or obtain the weight of the truck that is currently on the given physical scale. Other drivers waiting to use the given physical scale may be presented with a message, such as "scale is currently in use, please wait." When the current driver completes weighment, the given physical scale may be virtually unlocked so that a next driver in a queue can connect to it. If a driver currently on a scale doesn't complete their weighment and hence, unlock the scale, truck scale system 102 or virtual scale 304 may automatically time out the connection, after a predetermined amount of time (e.g., one minute) of being connected, to ensure that the scale isn't permanently locked.

In one embodiment, a truck driver may remotely interact with a mobile device that is connected to a virtual scale and kiosk, such as in the case of a driver operating a drone truck and weighing the truck on a scale and having the remote driver operate aspects of the client interface, such as the way a driver would work with the kiosk as if the driver was in the truck. The virtual scale 304 may also be configured with a weighmaster option that indicates that a driver needs to call the weighmaster at the scale-house to perform the weighment or to provide a personal identifier number (PIN) or code for a driver to connect to the virtual scale 304.

The truck scale administrator computing device 110 may further initialize a process (306) to create virtual kiosk 308 using the truck scale management system. Virtual kiosk 308 can also be created through an API. Virtual kiosk 308 may include a workflow for display on a truck driver mobile device 112. The create kiosk 306 process may include defining attributes of the virtual kiosk 308, such as pages, user interface (UI) elements, and billing options. Virtual kiosk 308 may be created manually or selected from pre-created templates.

Virtual kiosk 308 may be configured with "pay-to-weigh" and "company-owned" operating modes. A pay-to-weigh mode may allow scale-owners to charge drivers for each weighment, whereas the company-owned mode may not charge drivers. The company-owned mode allows the disclosed system to be used in cases where no payment is needed, such as in a plant where the aggregate producer owns the scale and doesn't charge for weighing a truck. A starting ticket value may be configured for generating custom ticket numbering sequences. The type of billing may also be configured for pay-to-weigh operation including billing to a customer's account or requesting a PIN associated with an account be specified, or billing to a credit card.

Weight units may also be specified to indicate units to be used for weighment, for example, tons, pounds, kilograms, and metric-tons. The disclosed system may be certified in accordance with the National Type Evaluation Program ("NTEP") where weights that are collected, displayed, and processed by the disclosed system are considered "legal weights" and can be used as part of a financial transaction.

Weighing methods may also be configured for the virtual kiosk 308 including "tare-then-gross weight," "gross-then-tare weight," "gross-weight only," "tare-weight only" (that allows for a truck's tare weight to be stored, independent of other work flows or weighments). In one embodiment, virtual kiosk 307 may comprise a "tare weight kiosk", where a truck's tare weight is acquired and stored in the cloud for future use. The stored tare weight may expire and a notification may be sent to a truck owner associated with the tare weight before the tare weight expires. According to one embodiment, virtual kiosk 308 may also be created with weighment work flow across an arbitrary number of scales. The weighment work flow may include an ability to have a truck weigh-in on a first scale using a first virtual kiosk and then weigh-out on a second scale using a second virtual kiosk. The server(s) 106 may generate a net weight for the two weighments, such that the first weighment is a gross weight and the second weighment is a tare weight, or vice versa. Workflows may be created through a computer scripting language (e.g., scale control and logistics environment).

According to one embodiment, a scale-owner may configure virtual kiosk 308 to provide discounts for re-weighments, where the cost for re-weighment is less than an initial weighment cost within a maximum amount of time that can elapse between the initial weighment and the re-weighment in order to receive the discounted price. Changes in re-weighment cost and time may also be tracked for future analysis. A special prefix may be assigned to re-weighment tickets. In addition, a scale-owner may configure virtual kiosk 308 to provide unlimited pre-ticketed re-weighments, such that a driver can reweigh their truck as often as they like and then only have the actual weigh ticket generated when the driver indicates completion, e.g., selects a "done" button.

Virtual kiosk 308 may also be created as a "payable kiosk" where a list of prices associated with a list of materials may be provided to a truck driver user along with the weight units for those materials, and have the system generate the price to be paid for receiving these materials, such as in a scrap metal yard. Similarly, virtual kiosk 308 may be created as a "receivable kiosk" where a list of prices may be provided to a truck driver user, along with a list of materials and weight units, for dumping the materials at a site, such as a landfill, and generate the pricing for dumping the material.

Truck driver mobile device 112 may be used by truck drivers to connect to and/or interact with truck scale system 102 through virtual scale 304 and virtual kiosk 308. Truck driver mobile device 112 may connect to truck scale system 102 via virtual scale 304 that may be downloaded to truck driver mobile device 112. Virtual scale 304 may include a SSID (or IP address, or public static IP) and a port number that a Transmission Control Protocol/Internet Protocol (TCP/IP) connection can be made to connect with truck scale system 102.

A location specified by a truck driver user or as determined by truck driver mobile device 112 may be provided to virtual kiosk 308 to verify a correct virtual scale 304 to connect to. Virtual kiosk 308 may comprise an interface with virtual scale 304 that allows inter-process communications of data from a physical scale at truck scale system 102. Server(s) 106 may create (310) kiosk pages and user interface elements 312 for rendering on a screen of truck driver mobile device 112 as defined by virtual kiosk 308. Kiosk pages and user interface elements 312 may include custom text fields, button, drop-down selectors for inputs that have a set of options to choose from.

In addition, the virtual scale 304 can be configured to allow a device to run in a "Tablet Kiosk Mode." The "Tablet Kiosk Mode" may comprise an interface running on a site-provided client device, such as a tablet-kiosk for public use. The "Tablet Kiosk Mode" may allow the interface to execute the disclosed weighment workflows but allow a driver to use a phone number or email address to operate the device, rather than logging in to a customer account. In the event that a client device loses connection to the server, a weighing session or activity may be saved on the client device and synchronize with the server when the connection is re-established.

Figure 4:
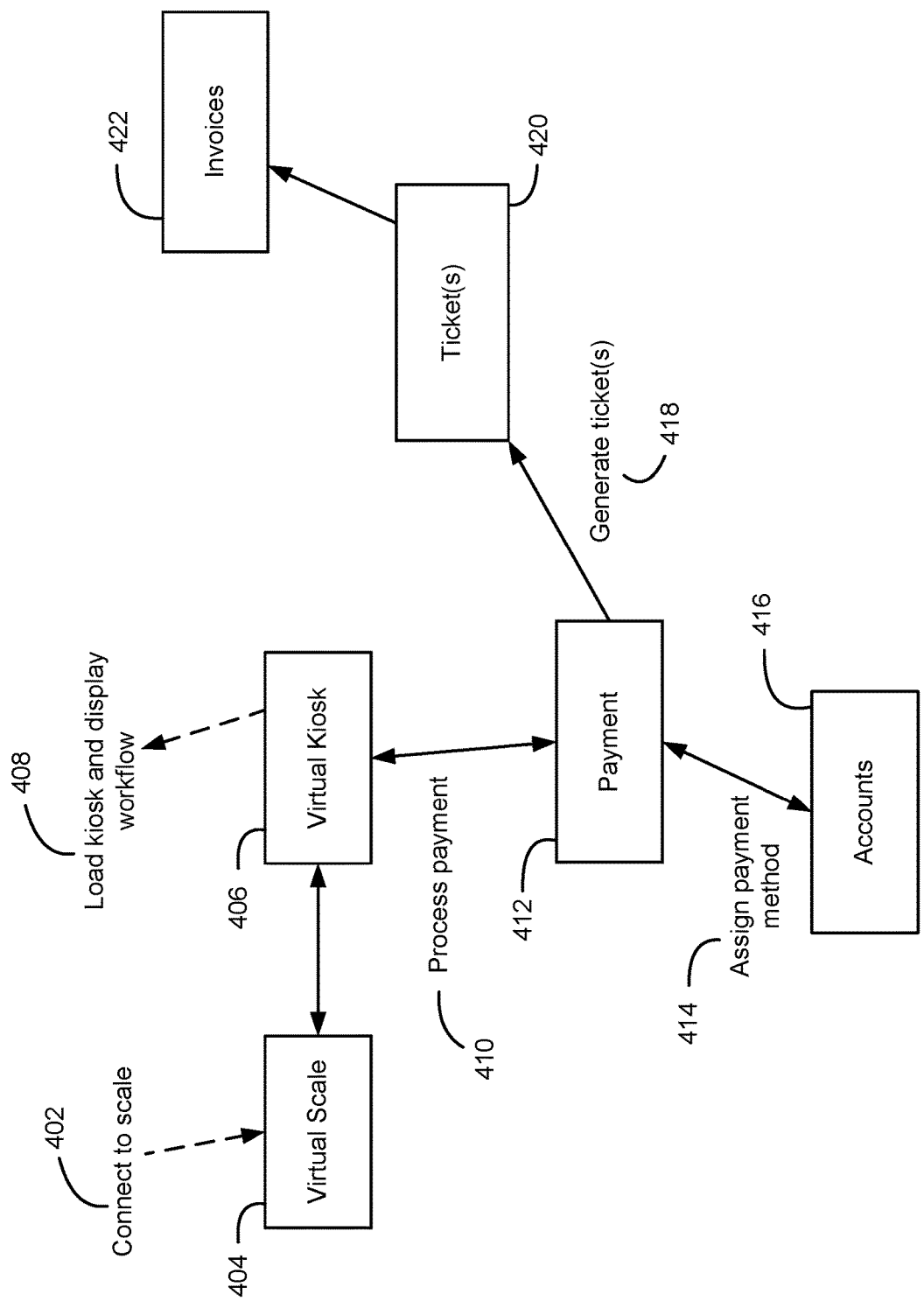
FIG. 4 presents another data flow diagram of a truck scale management system according to an embodiment of the present invention.

FIG. 4 presents a data flow diagram of a truck scale management system according to an embodiment of the present invention. A user from a device (such as truck driver mobile device 112) may connect to virtual scale 404 through via a TCP/IP connection (402). The virtual scale 404 may be automatically selected for a truck driver user on their device based coordinates or location code. For example, truck driver mobile device 112 may include a location services feature that can detect the location of the device using location data, such as GPS. A virtual kiosk 406 may be connected to or associated with virtual scale 404 and automatically downloaded to the truck driver device to display workflow on the device (408).

Payments may be solicited where they are processed (410) by payment 412. Users may pay by methods such as credit card/debit or company account-based billing and/or account pin. Selected payment methods are assigned (414) to accounts 416. For example, a trucking company can have an account and where the driver needs only to enter a PIN, rather than a credit card. Scale owners may create accounts for trucker users or owner operators. Accounts optionally have PINs for increased security and may be restricted to specific kiosks.

After payment is processed, ticket(s) are generated (418) and may be stored in a database. Ticket(s) 420 may comprise a digital ticket that is generated based on data from the scale and any information generated from virtual kiosk 406. Data on ticket(s) 420 may be displayed via the virtual. Invoices can be generated (422) when ticket(s) 420 are created.

Figure 5:
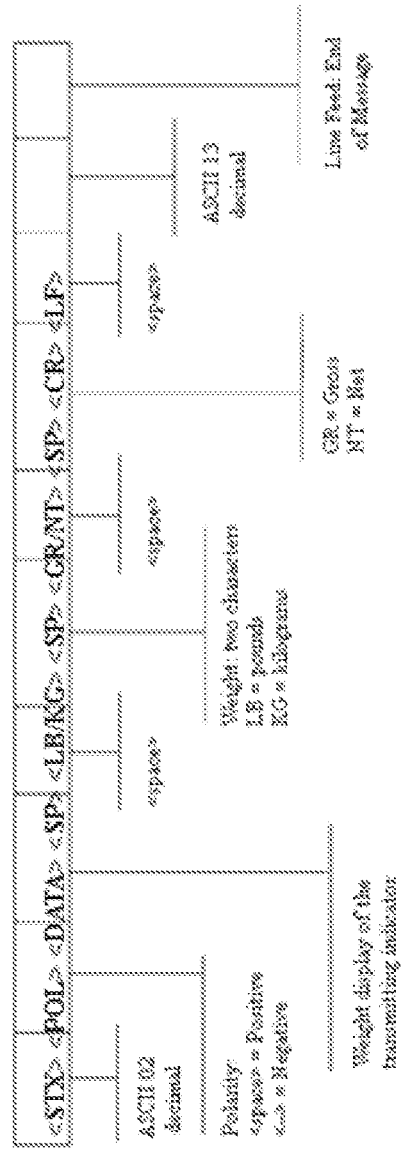
FIG. 5 illustrates an exemplary data string format according to an embodiment of the present invention.

The disclosed system may also include an instrumentation protocol for transmitting axle weights from a physical scale device to a mobile computing device or any other type of computer. Users, through a user interface, may specify multiple types of string formats that provide the axle weights and associated data, to the truck scale management system platform or any other scale management system. String formats may be specified in a serial data format may be used to interface with such computing devices. FIG. 5 presents an exemplary data string format that may be selected for generating output data from a scale. The serial data may be transmitted in an ASCII-compatible format.

Figure 6:
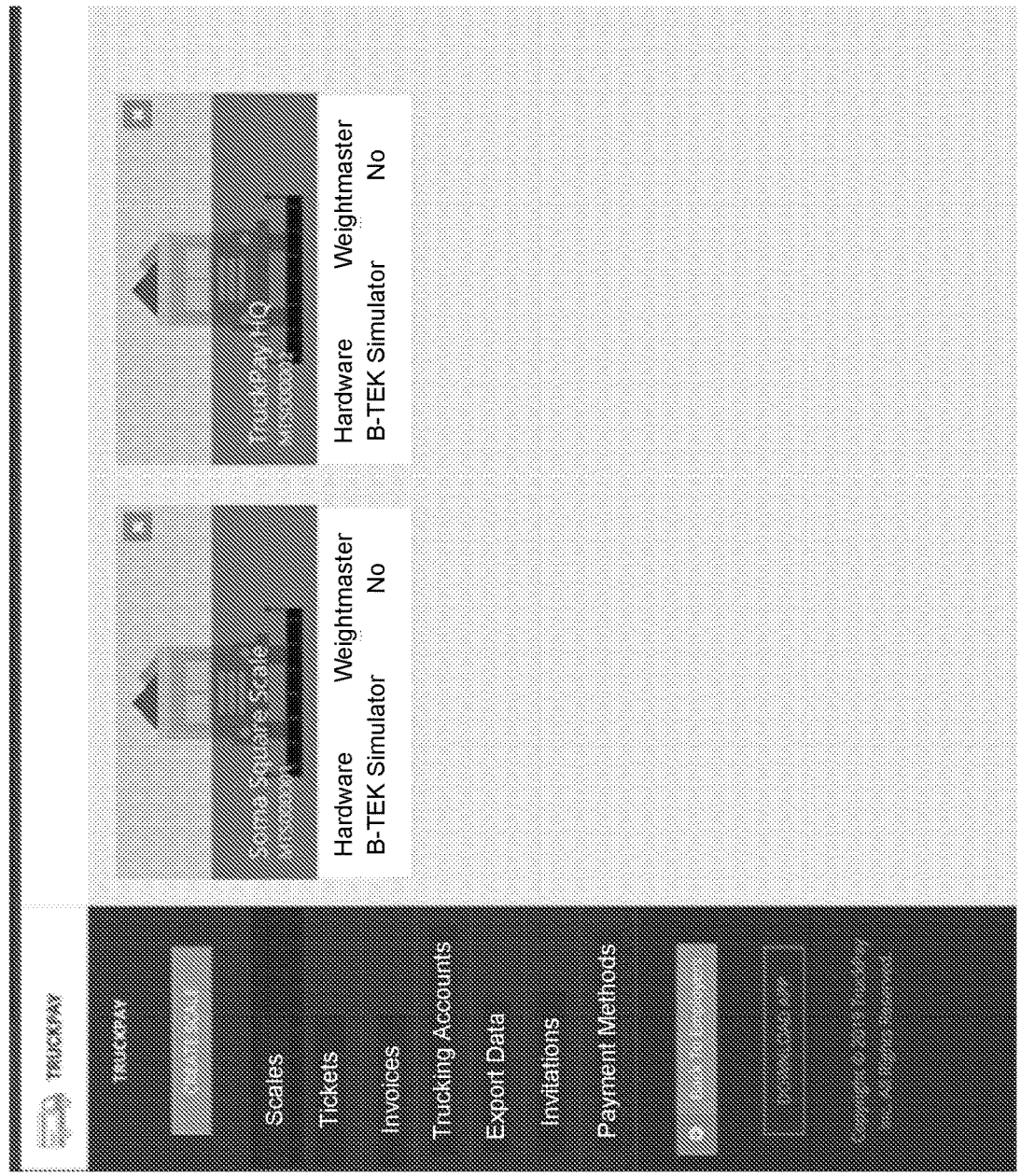
FIG. 6 illustrates an exemplary screen for managing scales according to an embodiment of the present invention.

Users may create and define virtual scales by, for example, signing on to a web portal of a truck scale management system. A virtual scale may comprise a software representation of a physical truck scale, specifically, the virtual scale definition describes how the truck scale operates. FIG. 6 presents an exemplary screen for managing scales that are owned or managed by an administrative user under an account according to one embodiment of the present invention. The user may create, remove, edit, and view virtual scales. Virtual scales may comprise a digital analog corresponding to a physical scale.

Figure 7A:
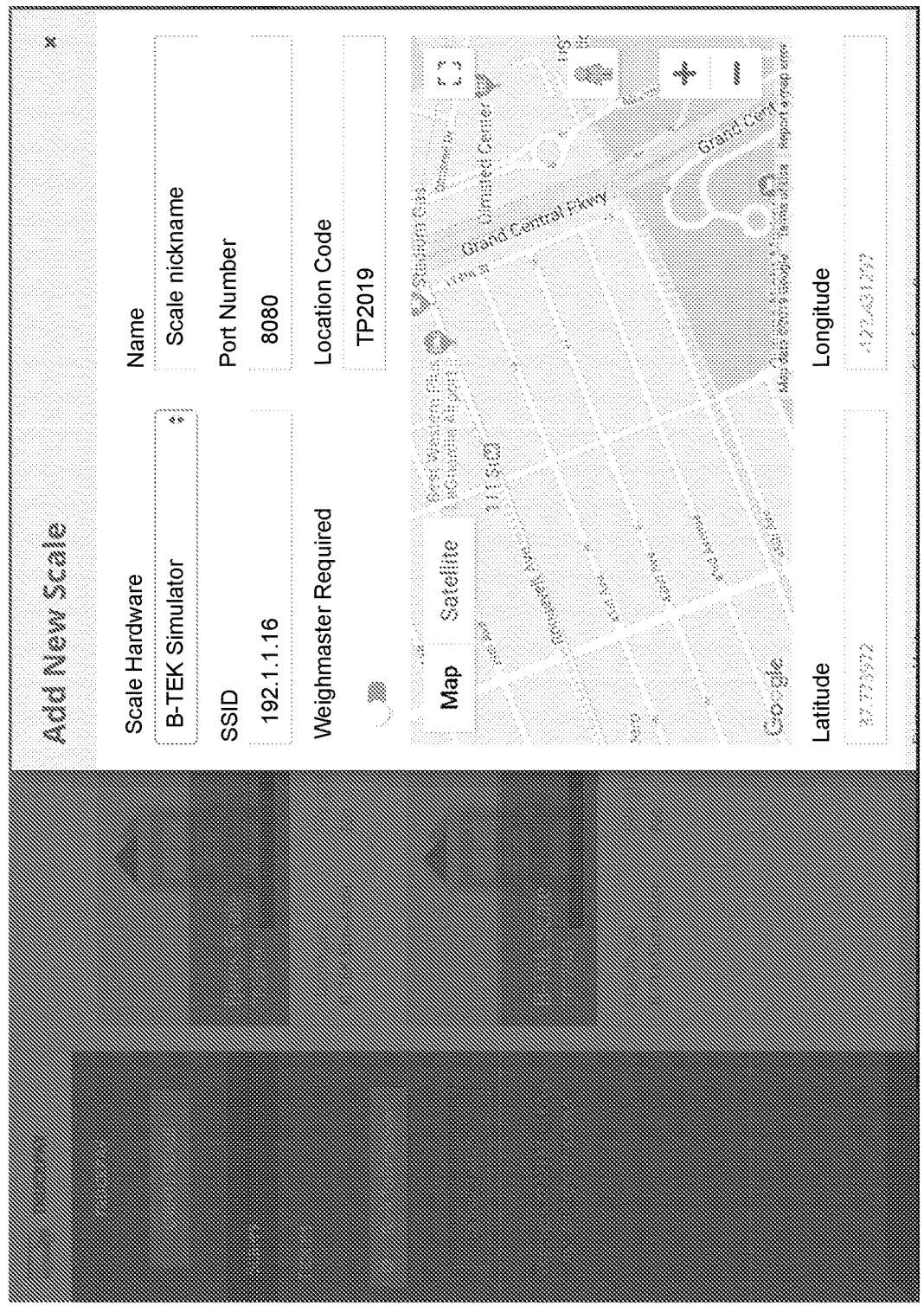
FIGS. 7A and 7B illustrate exemplary interfaces for adding scales according to an embodiment of the present invention.

A pop-up interface may be provided to add a new virtual scale as illustrated in FIG. 7A. The user may input information for creating the scale, such as scale hardware, a scale nickname, SSID, port number, location code and information (including latitude and longitude, and/or scale address), and a weighmaster requirement option.

Figure 7B:
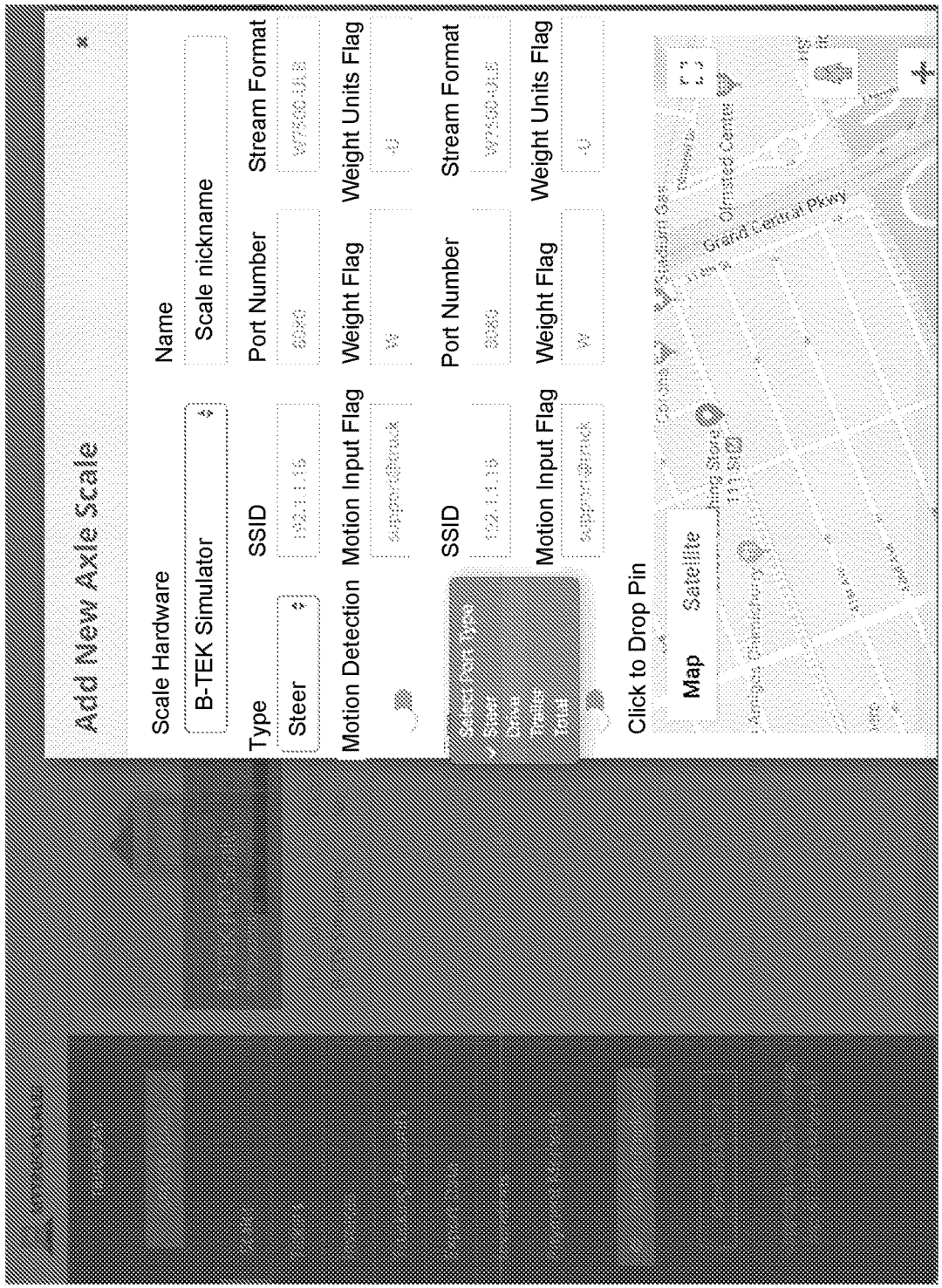

FIG. 7B presents an exemplary interface for providing axle weights to a new virtual scale according to an embodiment of the present invention. If a scale device has axle weighing capability, a multi-port stream representation may be configured as a default data stream transmitted. The virtual scale may override this default and to specify exact ports over which different axle strings, containing different axle weights, can be sent. The format of the string/streams that the scale device transmits can be customized by the scale-owner to accommodate their own specific needs. By providing a user interface to graphically describe the format of the string(s) makes it easier for the user to specify how to electronically communicate with an axle weighing scale.

Axle weights may comprise a steer weight, drive weight, and a trailer weight. Alternatively, the scale device may also provide a data stream with the sum of these three weights, also known as the total weight. A weight sum is not required to be specified, as this value may be calculated from the other three weights. Virtual scales may send weighment streams in a given stream format to a kiosk or any server connected to the physical scale for obtaining weighment data for given weighment workflows. A scale-owner may specify any type of stream (format) that a virtual scale sends for a physical scale.

Figure 8:
Figure 9:
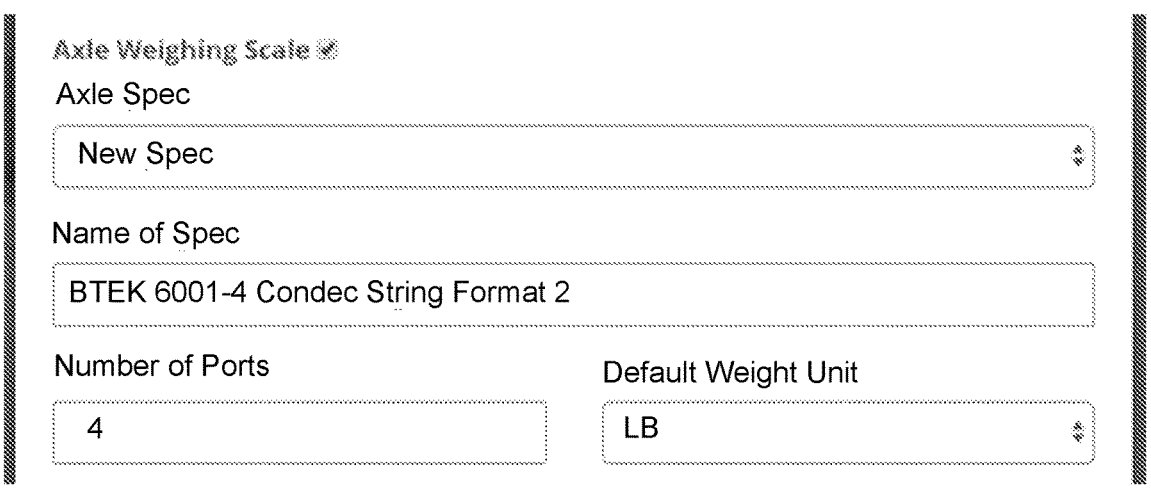

FIG. 8 presents an exemplary interface for axle specification according to an embodiment of the present invention. A scale owner user may select an axle specification for attaching to a scale, such as a previously created (company) axle specification. Existing axle specifications may be edited (FIG. 9). Additionally, a new axle specification may also be created using an interface that may allow a user to specify a name for the new axle specification, a number of ports needed, and a default weight unit, if any. The scale owner user may indicate how many data streams can be sent by a physical scale device and over which ports. Specifically, the user may enter the number of ports, the port numbers, and which of the steer, drive, trailer, and total weight streams are specified on which port(s).

FIG. 10 presents an interface for configuring port streams according to an embodiment of the present invention. A given port may be assigned a name, an IP address or service set identifier (SSID), a string notation used (e.g., a new string format or a Condec (ISO 9001 certified corporation) string format), and number of sections for the string notation. Selecting a Condec string format may pre-fill forms for string sections based on the selected format. A user may indicate other formats of the string(s) or string notation by typing it in or selecting from a list and graphically indicating where e.g., the steer weight, drive weight, and trailer weight, and total weight are in the string. For multiple ports, the user may configure the format of a particular string sent over the specified port. The user may also configure which weight string, e.g., steer or drive or trailer weight, is sent over which port. The user can also configure if a total weight is sent and over which port. The user may configure which parts of the string corresponds to weight, weight units, and motion flag. The user may also configure where a motion flag, if one exists, and where the weight units are located within each string.

FIGS. 11 through 18 present exemplary port string notation section forms according to embodiments of the present invention. Sections of a string notation may be configured as "String," "Set," "Variable Number," or "Fixed Number" formats according to a given string notation (e.g., Condec Continuous String).

Figure 12:

Headers and trailers may be used to delineate blocks of port stream data. For example, first and last sections of a port string notation may be configured using a "String" format, e.g., "\x02" to denote a start of transmission (FIG. 11) and "\r\n" to denote an end of the transaction (FIG. 12).

Middle sections of a string notation may include information carried by port streams. Information may be indicated in string notation sections using a "Set" format. The "Set" format includes a representation field identifying what a given section represents. The representation field may include parameters that define character(s) to look for and what it would mean.

Figure 13:
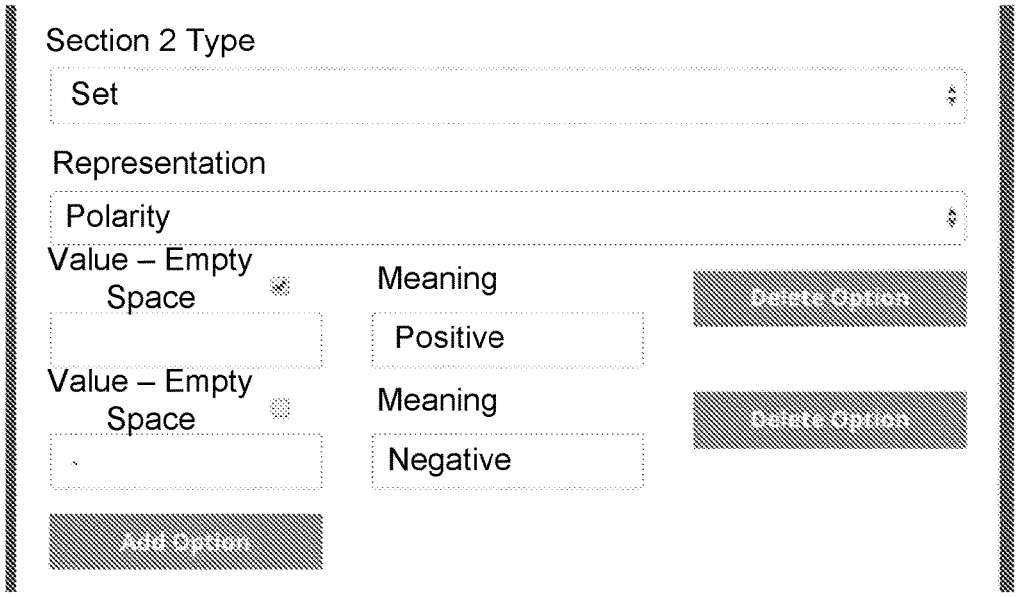

FIG. 13 presents an exemplary interface for configuring a set format section to represent polarity according to an embodiment of the present invention. As illustrated, "Section 2" of a given string notation comprises a "Set" format that is configured to represent polarity. Given values in section 2 are defined with corresponding meanings. An empty space character is defined to indicate positive polarity and a '−' character is defined to indicate negative polarity.

Figure 14:

FIG. 14 presents an exemplary interface for configuring a fixed number format section to represent axel weight type according to an embodiment of the present invention. "Section 3" of a given string notation comprises a "Fixed Number" format that is configured to represent axel weight type. In the illustrated example, steer weight is chosen, however, other axel weight types may be selected, e.g., drive weight, trailer weight, total weight, etc. The fixed number is specified with a given length and padding with empty space.

Figure 15:
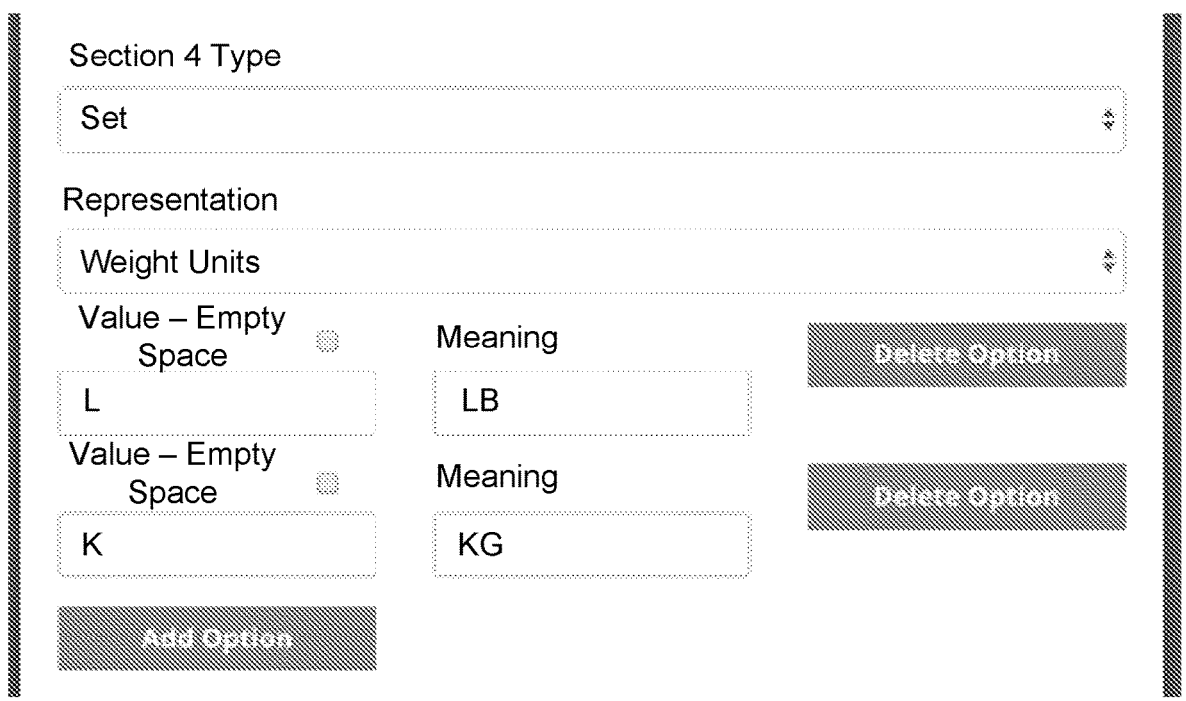

FIG. 15 presents an exemplary interface for configuring a set format section to represent weight units according to an embodiment of the present invention. As illustrated, "Section 4" of a given string notation comprises a "Set" format that is configured to represent weight units. An 'L' character is defined as indicating pounds ("LB") and a 'K' character is defined as indicating kilograms ("KG").

Figure 16:
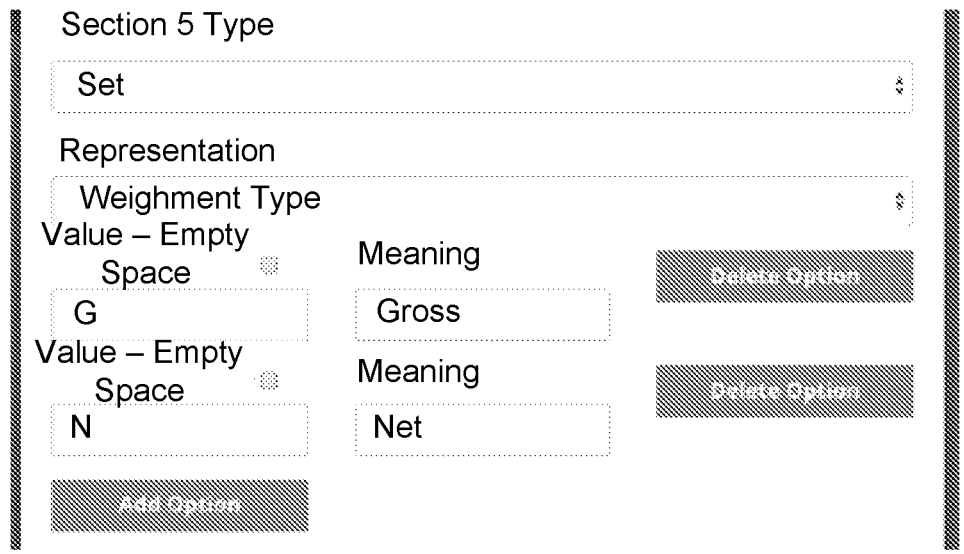

FIG. 16 presents an exemplary interface for configuring a set format section to represent weighment type according to an embodiment of the present invention. As illustrated, "Section 5" of a given string notation comprises a "Set" format that is configured to represent weighment type. A 'G' character is defined as indicating gross weighment and a 'N' character is defined as indicating net weighment.

Figure 17:
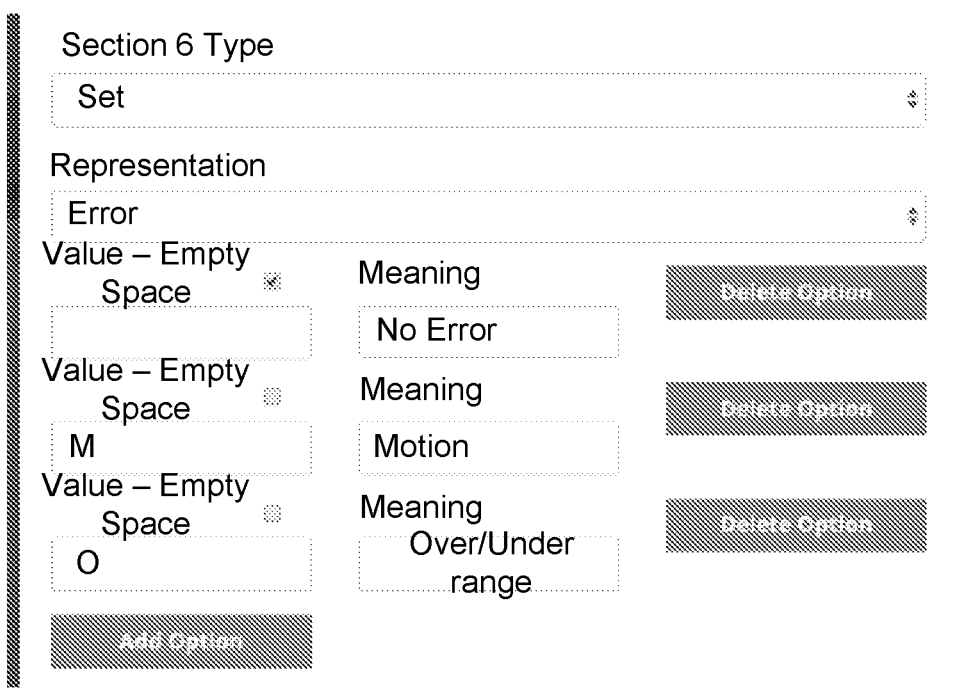

FIG. 17 presents an exemplary interface for configuring a set format section to represent error according to an embodiment of the present invention. As illustrated, "Section 6" of a given string notation comprises a "Set" format that is configured to represent error types. An empty space character is defined as indicating no error, an 'M' character is defined as indicating a motion error, and an 'O' character is defined as indicating an over/under range error.

FIG. 18 presents an exemplary string notation using a variable number format according to another embodiment of the present invention. "Section 1" is configured as a variable number format representing axel weight type. In the illustrated example, steer weight is chosen, however, other axel weight types may be selected, e.g., drive weight, trailer weight, total weight, etc. The variable number is also specified as having a minimum and maximum length.

When interfacing between scale and client devices an API may obtain, save, and annotate strings with appropriate delimiters so that they can be matched against a regular expression that describes how the string(s) are to be parsed. The system may parse a scale owner user-indicated format of the string and ask the user to confirm that each value is correct. If the values are not correct, then the user may be shown the problematic part of the string and be given an opportunity to fix it. After fixing the string, the user can have the system try to parse a string again. Once a string representation has been successfully parsed and saved, an API may be able to retrieve it, so that scale owner users or administrators can modify it. A user may take the result of the API and display it, for example, on the web, so that the user can see which parts of the string(s) represents the steer, drive, trailer weight, and the other parts of the string(s) that were originally saved.

Figure 19:
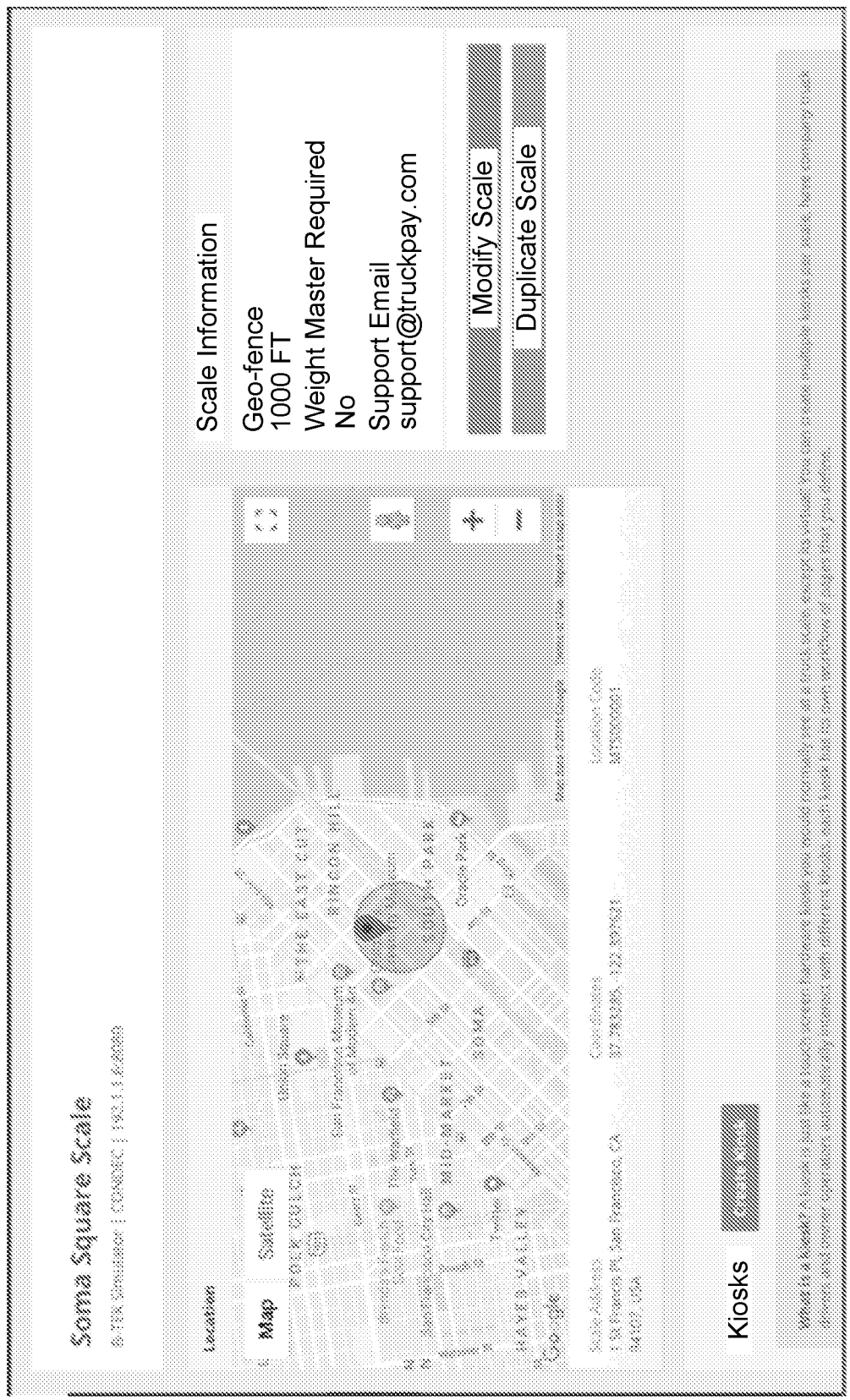

Any one of created virtual scales may be selected for viewing of scale information and details. The exemplary illustration of FIG. 19 presents a scale view of a given one of existing virtual scales in the account. The scale view displays a location of a physical scale (e.g., map view including address, coordinates, and location code) and scale information that was provided in creating the virtual scale. In the illustrated example, the scale information includes geo-fence distance, weigh master requirement, and a support email address. The scale view also allows the user to modify the scale (information) or duplicate the virtual scale to create another virtual scale entry.

Figure 20:
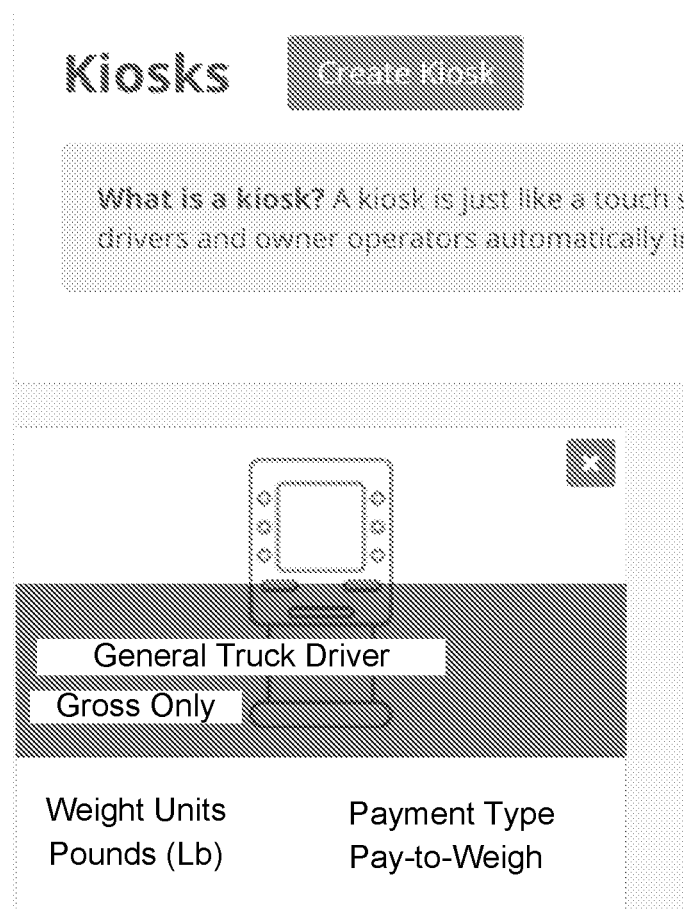

The scale view further includes one or more virtual kiosks connected to the virtual scale. The scale view includes an option to view, create, and remove kiosks for the virtual scale, as provided in the illustration of FIG. 20. A virtual kiosk may be created to electronically document the use of a scale, for example, to accept credit card payments or account billing for pay to weigh scales. A virtual kiosk may also be configured to record items such as truck and trailer IDs as well as the material being weighed. Multiple kiosks may be created for a scale. Truck driver users may connect to a scale's different virtual kiosks, depending upon how they need to use the scale and the types of authorization they have been given.

Figure 22:
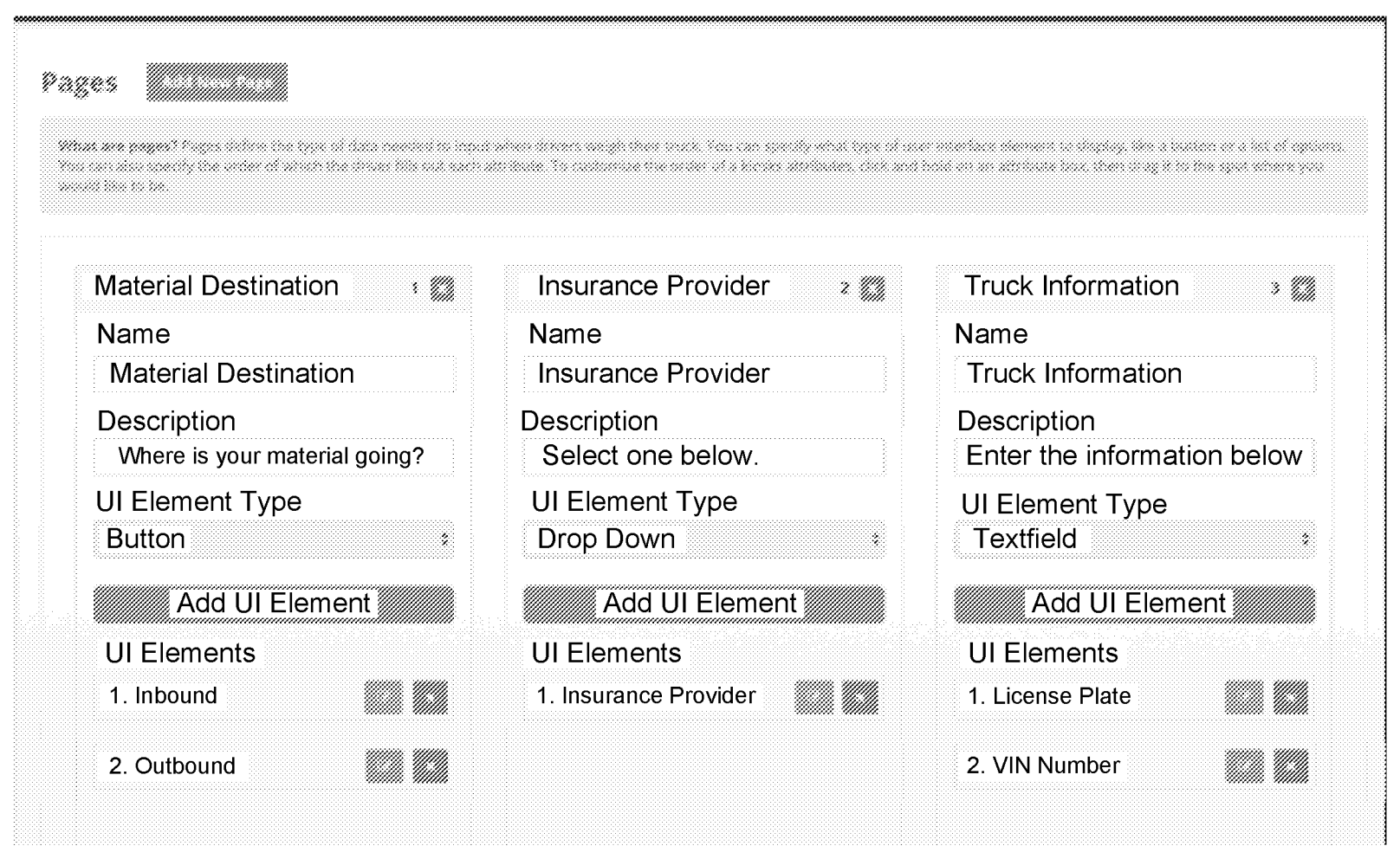
Figure 23:
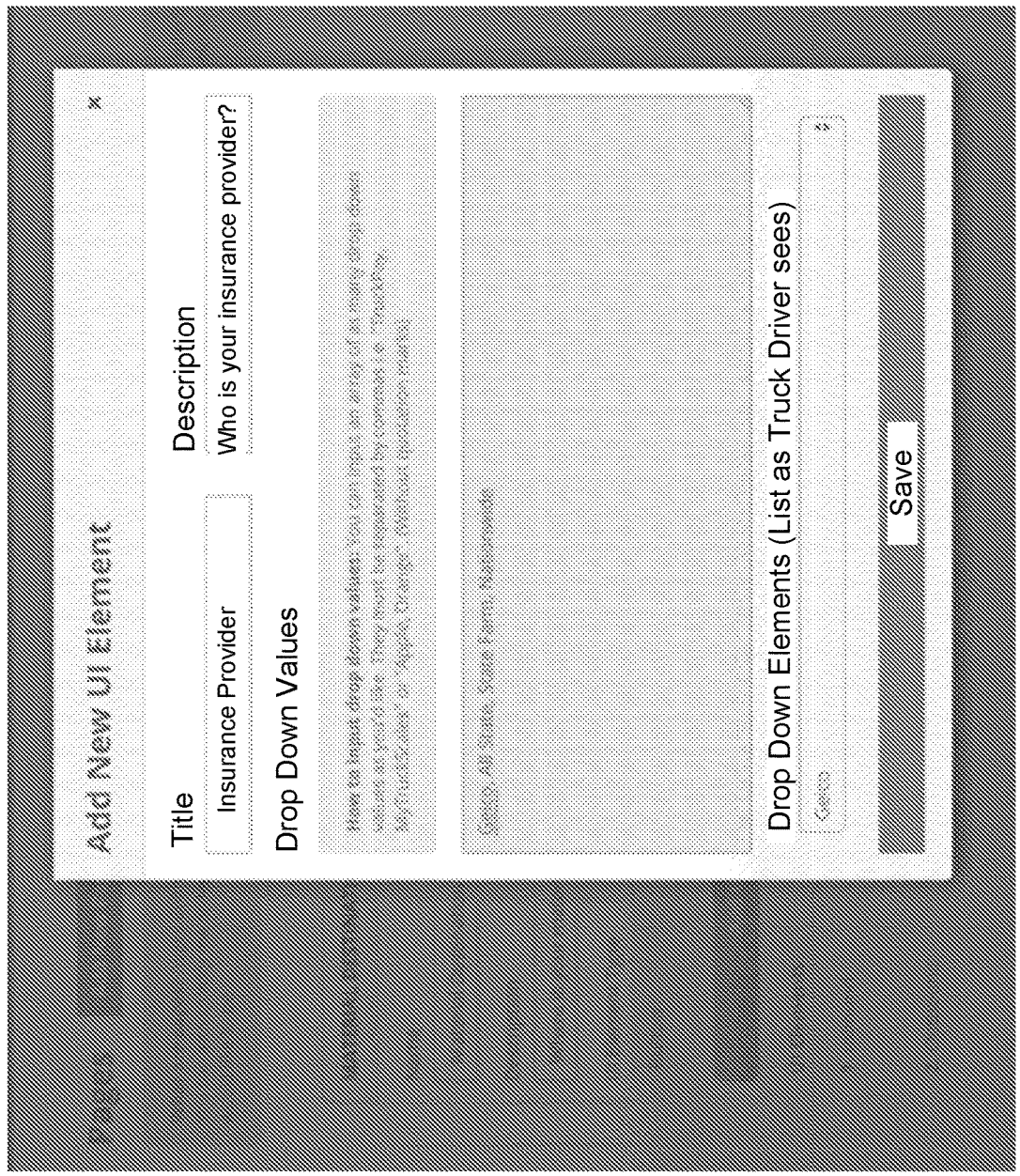

FIG. 21 presents an exemplary kiosk view of a given kiosk created for a virtual scale according to one embodiment of the present invention. The user may view and edit a given virtual kiosk and its pages. Each kiosk may include a workflow of pages that can be added and edited. A user may create pages that define the workflow for the kiosk, as illustrated in FIG. 22. Pages of a kiosk may define types of data that are solicited by the kiosk. An order of which pages presented by the kiosk may also be configured. For example, to customize the order of kiosk pages, an attribute box (e.g., "MATERIAL DESTINATION," INSURANCE PROVIDER," OR TRUCK INFORMATION") may be dragged and rearranged in a desired order. Pages may contain a title, description, a UI element type, and UI element attributes. FIG. 23 presents an exemplary interface for adding a new UI element on a given page according to one embodiment. A UI element may be used to define a predefined list of inputs that may be selected from, e.g., text-fields, buttons, and drop-down selectors.

Figure 24:
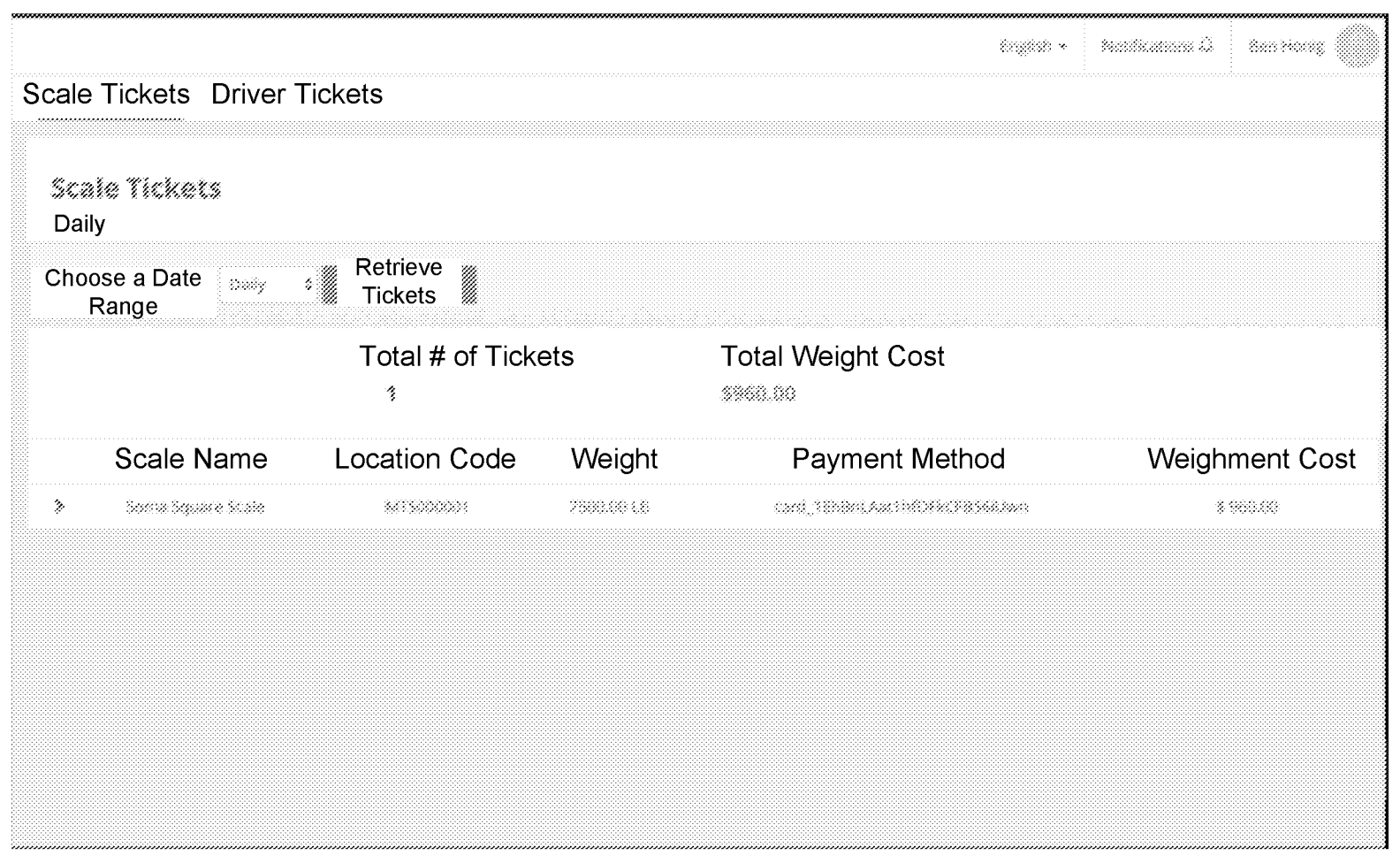

FIG. 24 presents an exemplary tickets interface according to one embodiment of the present invention. The administrative user may be able to view scale tickets and driver tickets produced by the scale management system from the operation of the kiosk and scales. Tickets may be retrieved for any period, e.g., daily, weekly, monthly, annual, etc. A ticket may include information, such as scale name, location code, weight, payment method, and weighment cost.

Figure 25:
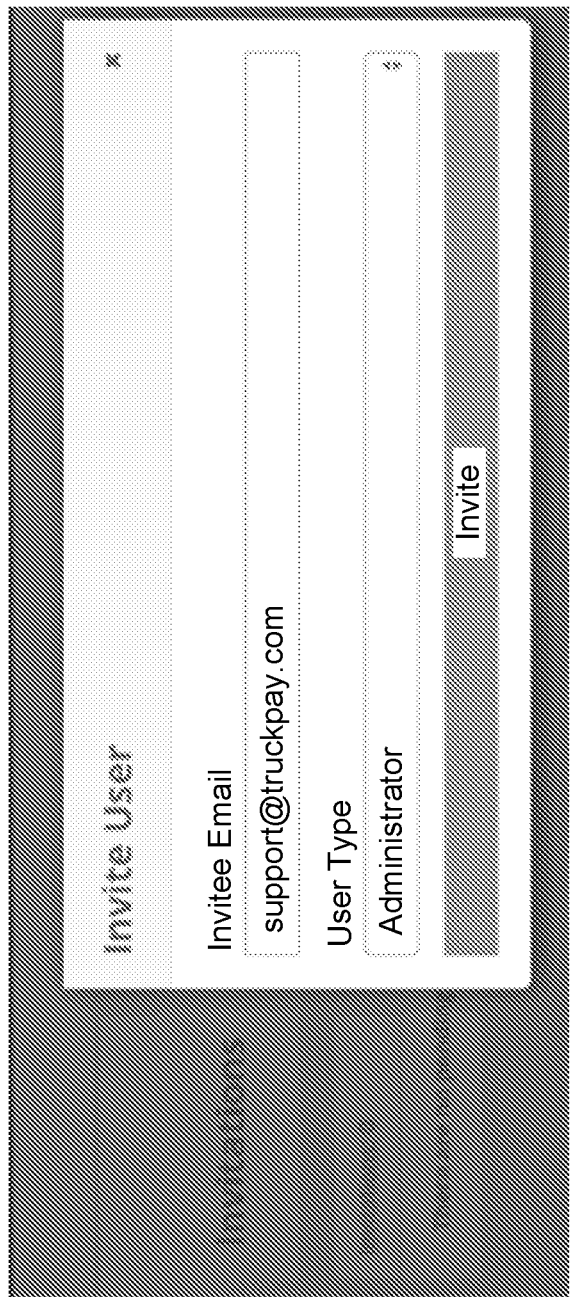

The disclose truck scale management system may be a highly secured system with role-based application entitlement. The administrator user may be allowed to create user access to truck scale management system, as illustrated in FIG. 25. Users may be invited as either a truck driver user, an administrator, or a scale distributor. The ability to create virtual scales/kiosks and authorize invoice payments may be limited to administrators, whereas truck driver users may be limited to accessing the virtual kiosk/scales to weigh their trucks. A scale distributor may be configured to be associated with the scale owner's company such that the scale distributor can perform scale configurations on behalf of the scale owner.

Figure 26:
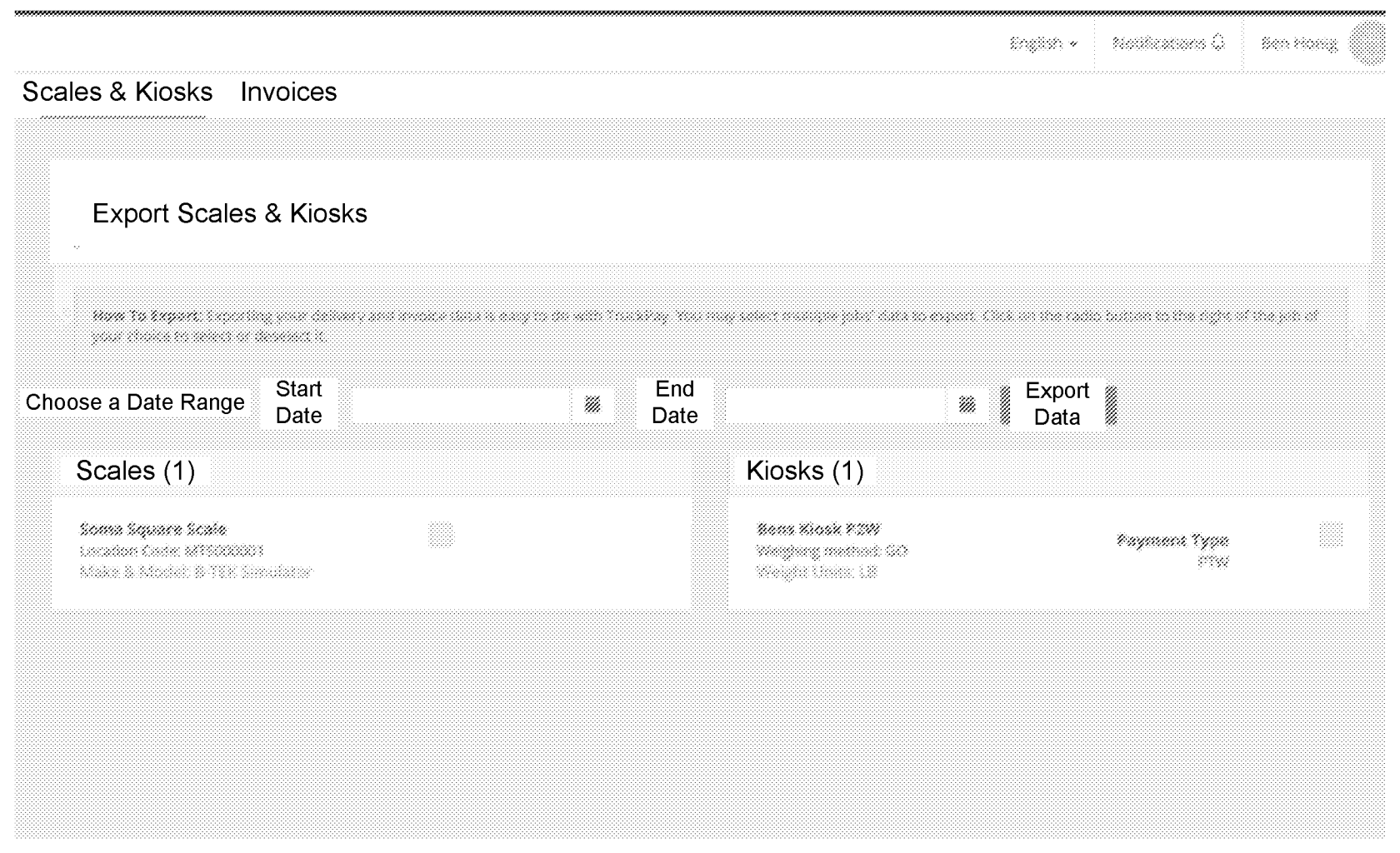

FIG. 26 presents an exemplary interface for exporting weighing and invoice data, e.g., in the form of weigh tickets and invoices from the scales and kiosks according to an embodiment of the present invention. The interface may allow for selection of particular weigh ticket and invoice data to export, such as from particular scales or kiosks. Scale and kiosk data may be exported in file formats, such as Portable Document Format (PDF), spreadsheet (e.g., Excel), and Comma-Separated Values (CSV). Weighments and invoices may also be exported to another upstream system, such as enterprise system software from SAP, via an API.

Figure 27:
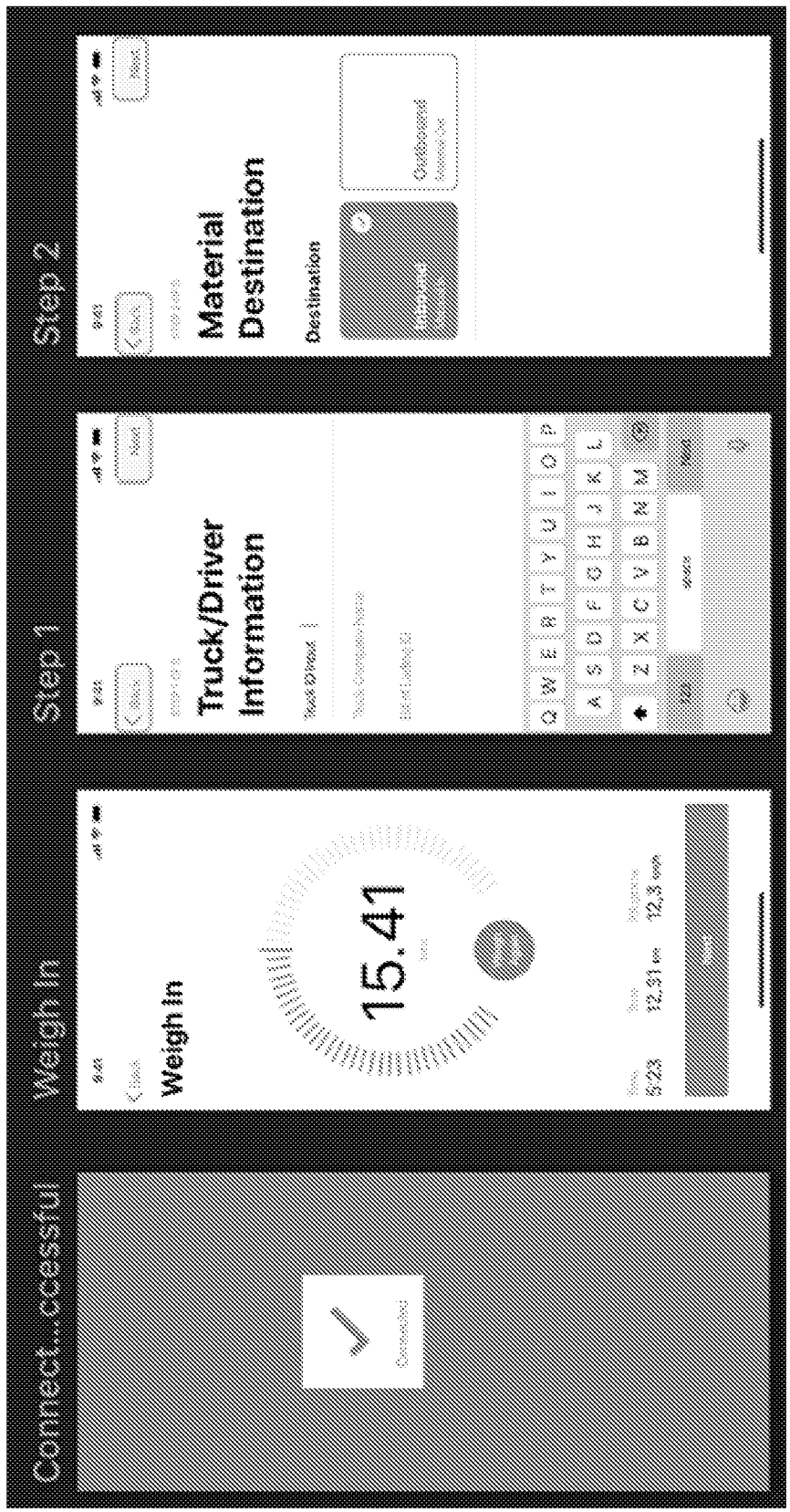
FIGS. 27 through 30 illustrate exemplary screen interfaces for operating a scale with a truck scale management system according to an embodiment of the present invention.
Figure 28:
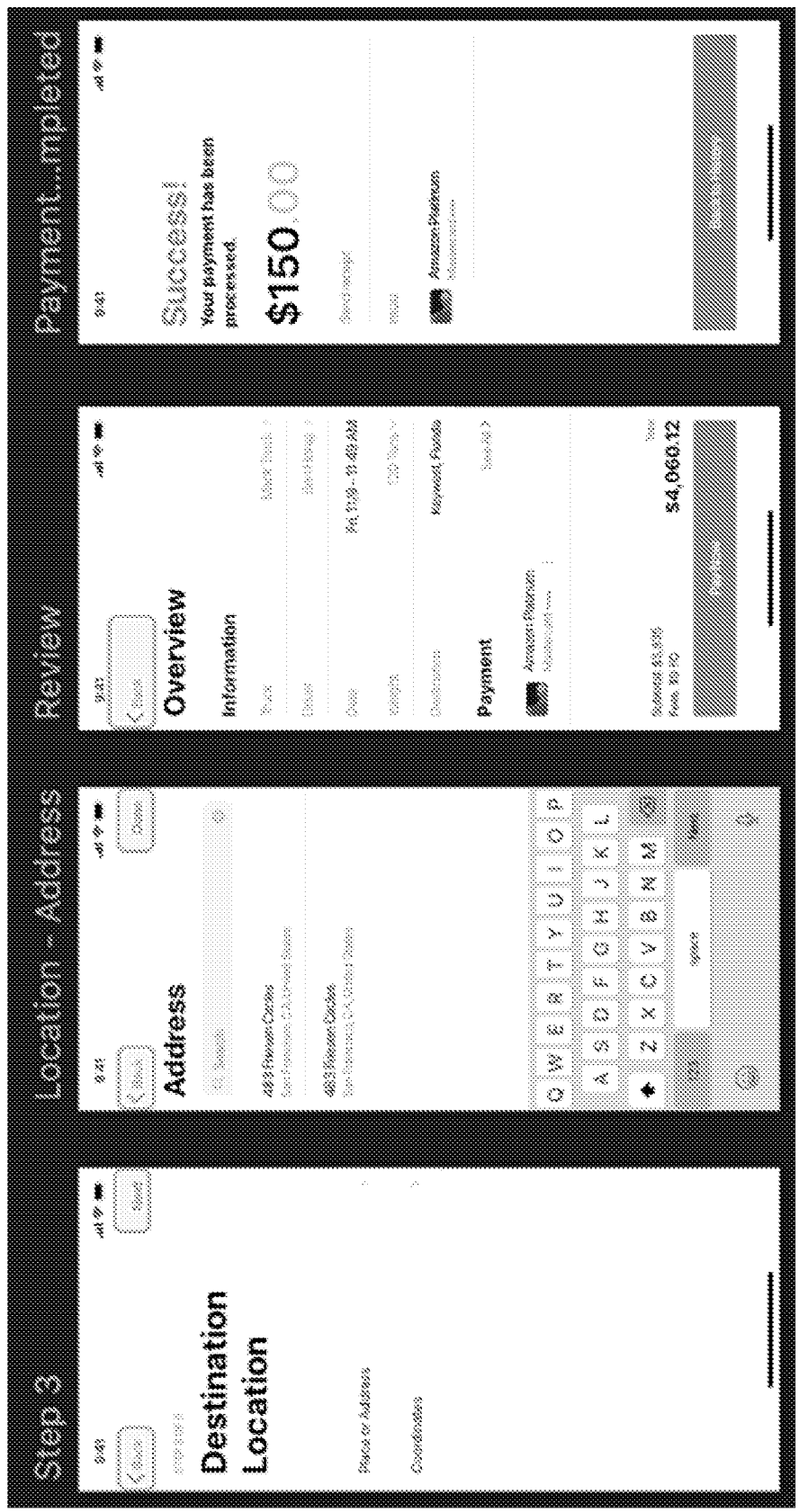

FIGS. 27 and 28 present exemplary interfaces for using accessing and utilizing a scale configured with a truck scale management system according to an embodiment of the present invention. A truck driver may pull onto a truck scale and tap a "connect to scale" button on an application executing a virtual kiosk on a mobile device to connect to a scale. For example, the truck driver or mobile device of the truck driver may specify a location to locate a nearest scale and initiate a workflow for weighing via a virtual kiosk. Scale location codes may be employed when pick-ups or deliveries are made to help locate a scale, if for example, location services aren't turned on.

The virtual kiosk can be one of many, or a same virtual kiosk used for a plurality of users at a truck scale system or a particular truck scale. The virtual kiosk may connect to the scale via an SSID (or IP address, or static IP address) and port number and parse a string (according to a given string format) containing axle weights of a truck including steer, drive, trailer, and gross weight ("Weigh In"). The weight is displayed on the driver's mobile device. If the driver has not turned on data location services on the mobile device, then a location code displayed at the truck site may be inputted to tell the server the location. This may enable the mobile device to automatically connect to the scale.

Once connected to the scale ("Connect . . . successful"), the application may download an appropriate virtual kiosk for the truck driver. The application may then build and render custom views based on the parameters from the pages defined in the virtual kiosk. The application may then guide the truck driver through the customized work flow of the virtual kiosk ("Weigh In," "Step 1," "Step 2," "Step 3," "Location-Address," Review," and "Payment . . . completed.").

In one example, if weighing gross weight, the driver may be asked if the truck is already on the scale and ready for gross weigh in. Once the driver taps yes, weight may be captured and saved, along with date and time of the weighing. The driver may be prompted to confirm the weight and the fact that a gross weight was captured should be recorded. If a weighmaster is required (as configured in the virtual kiosk), then the driver may be told to call the weighmaster to complete the weighment. Additionally, in the event of weighing by TG and the current weighing is the gross weighing, a re-weighment cost may be given for this ticket. Similarly, if weighing by GT and the current weighing is tare weighing, a re-weighment cost may be given for this ticket.

For pay to weigh virtual kiosks, the truck driver may input credit card or company account information for automatic billing in order to pay for the weighment. A ticket may then be generated in a database. In cases where no payment is required for the use of the scale, then no payment information is requested. The virtual kiosk may allow a scale owner to have his scale used as either a credit card or an account-based pay to weigh scale or as a free scale, depending on who is using it. Different types of information and work flow may be collected and presented, depending on the truck driver who is using the kiosk.

Figure 30:
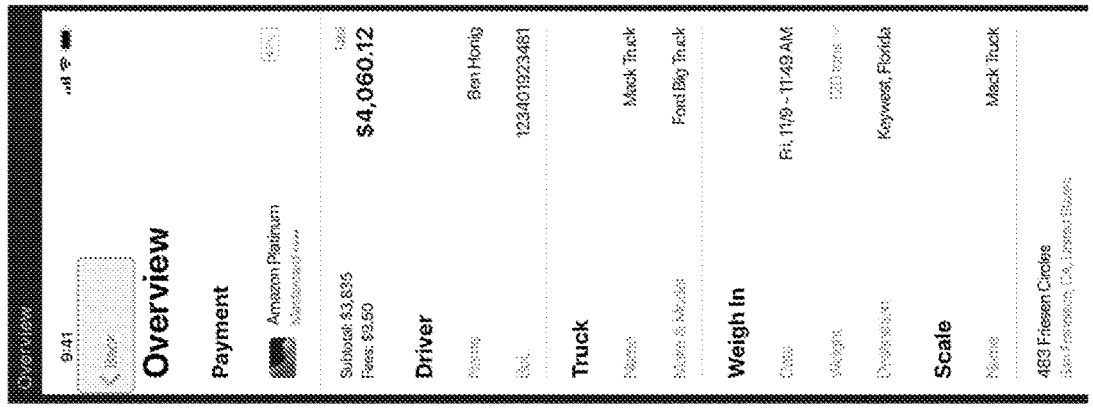
Figure 29:
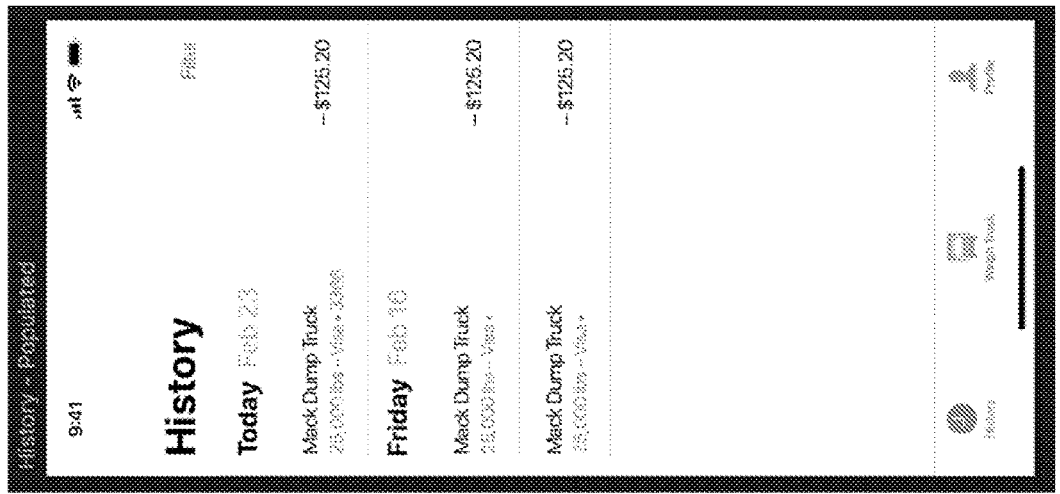

Users can view a history of all tickets generated for a particular virtual kiosk/scale (as shown in FIG. 29) and view any data associated with the virtual kiosk/scale. This includes, but is not limited to, data inputted on the virtual kiosk, exemplified in FIG. 30.

Figure 31:
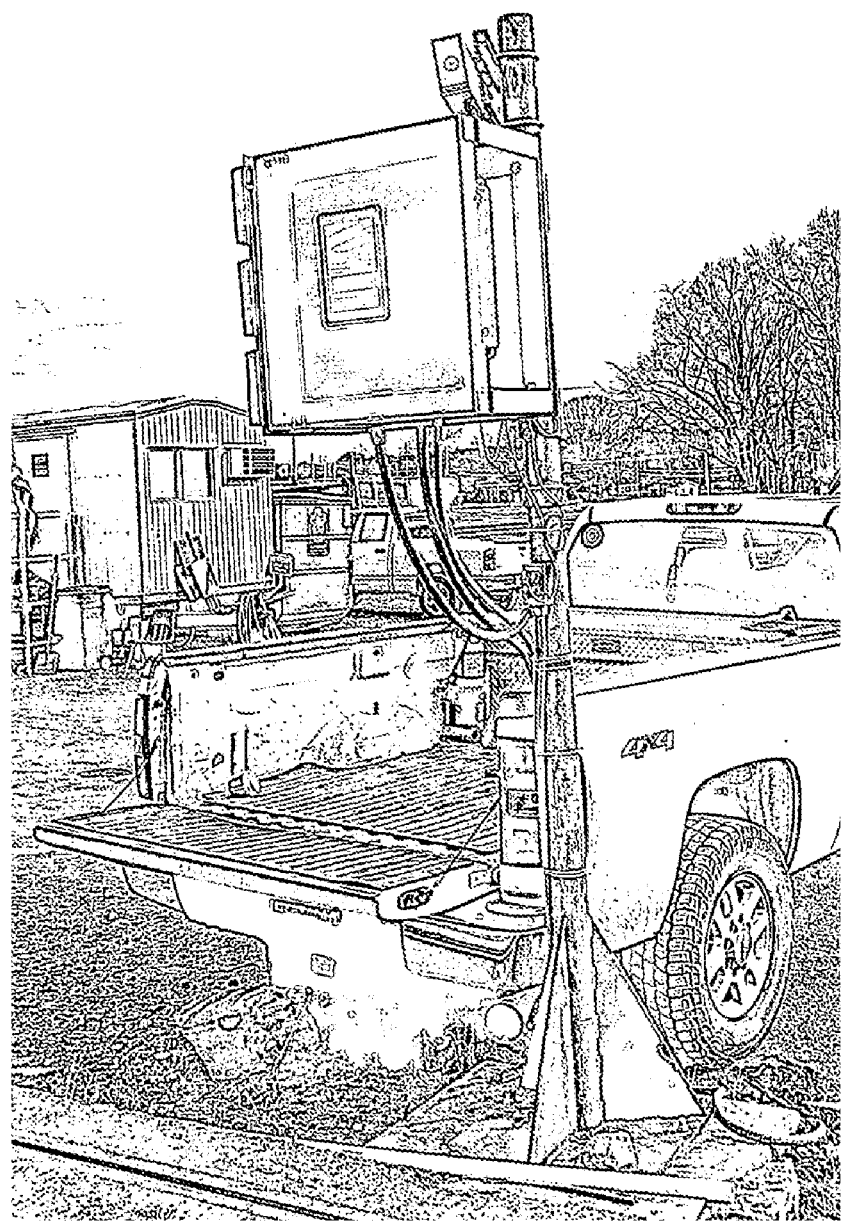
FIGS. 31 and 32 illustrate a tablet kiosk device according to an embodiment of the present invention.
Figure 32:
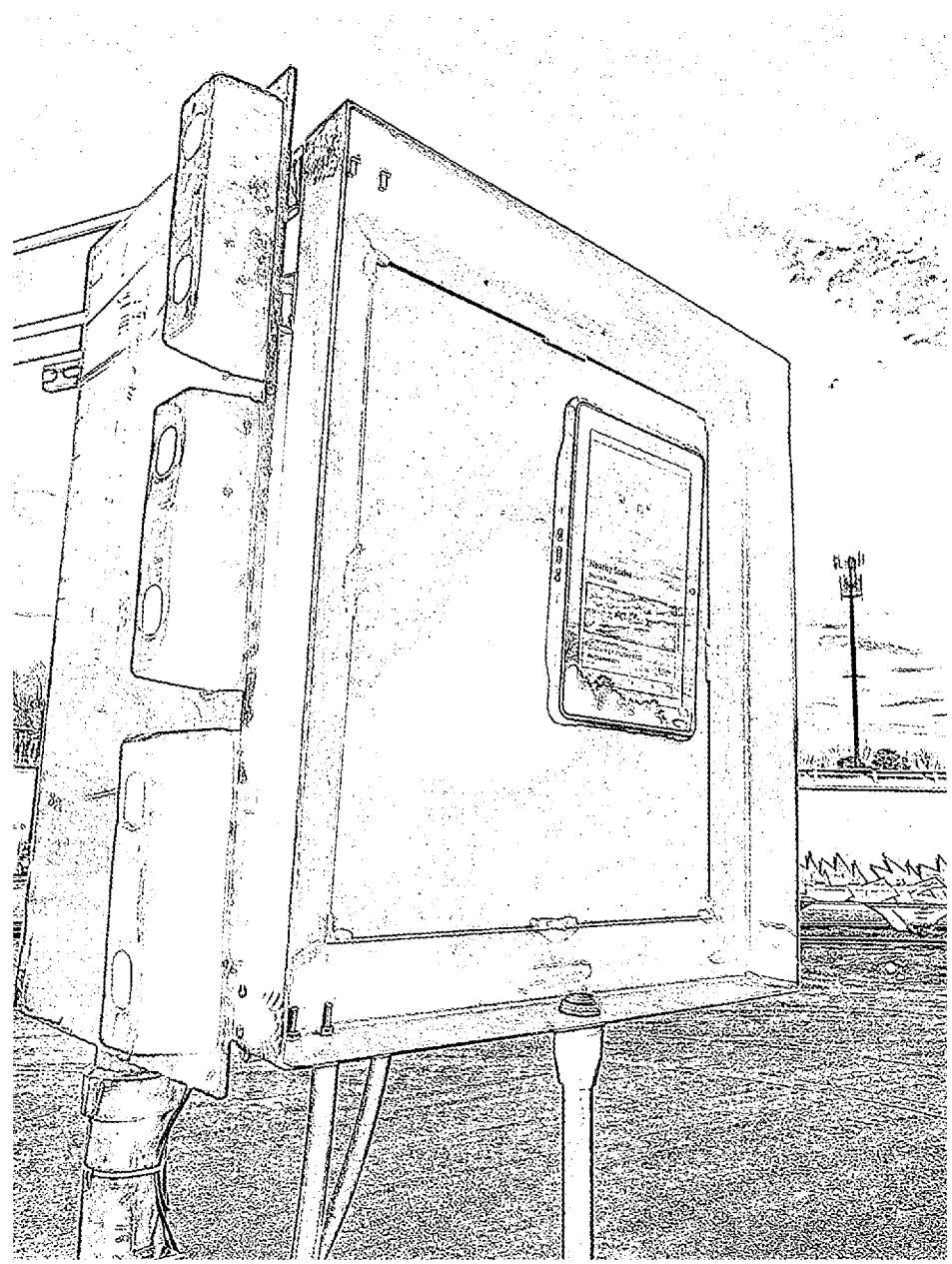

FIGS. 31 and 32 present a tablet kiosk device according to an embodiment of the present invention. A tablet kiosk device may comprise a site-provided client device that allows a driver to use the disclosed weighment workflows. According to one embodiment, a site may comprise a plurality of tablet kiosk devices allowing for a plurality of users to execute weighment workflows simultaneously. Virtual tablet kiosks may execute on the tablet kiosk devices to enable the public use of weighment workflows via a single login mode user using messaging communications, such as email and/or SMS to send weigh tickets to the user.

Figure 33:
FIG. 33 illustrates a scale view of a virtual scale supporting a virtual tablet kiosk according to an embodiment of the present invention.

FIG. 33 presents a scale view of a virtual scale supporting a virtual tablet kiosk according to an embodiment of the present invention. The scale view displays a location of a physical scale (e.g., map view including address, coordinates, and location code) and scale information that was provided in creating the virtual scale (e.g., geo-fence distance, weigh master requirement, and support information). The scale view also allows the user to modify the scale (information), axel specification, or duplicate the virtual scale to create another virtual scale entry.

The scale view further includes one or more virtual kiosks connected to the virtual scale. As illustrated, the virtual scale can be interfaced with a virtual tablet kiosk. Parameters of the virtual tablet kiosk may be edited. The parameters include a default language, an email address or phone number for support, single login, user login, send tickets through short message service ("SMS"), and send tickets through email address. A virtual tablet kiosk may be executed on a computing device (e.g., a tablet computer) to communicate with the virtual scale. The computing device may connect to the virtual scale via a communication network by specifying a SSID or location identifier to a server.

The virtual tablet kiosk may be configured to operate in a single login mode that allows truck weighing and provides fields for entering in a driver's (e.g., virtual tablet kiosk user) phone number or email address. The "single login" mode may comprise a guest login feature that solicits the email address or phone number from driver to execute workflows associated with weighments, ticket generation, and payment (for pay-to-weigh) operations as disclosed above. A server communicating with the virtual tablet kiosk for executing the workflows may use the driver provided email address or phone number to track a weighment ticket and direct weighment flow for the virtual tablet kiosk user, e.g., TG, GT, and TO weighings. The driver email address or phone number may be used to send the weighment ticket and saved as part of the ticket. For pay-to-weigh, the driver may enter credit card or payment details prior to truck weighing.

The virtual tablet kiosk may also be configured to operate in a "user login" mode where the driver may login with a user account as disclosed above.

The scale owner may be able to see a ticket history for a particular virtual tablet kiosk on their scale ticket history report. A scale-owner may also view activities on a plurality of virtual tablet kiosks and indicate on a ticket report that certain tickets originated from a particular virtual tablet kiosk.

FIG. 34 presents an exemplary interface for adding a new kiosk for a virtual scale according to an embodiment of the present invention. A virtual kiosk may be created with data fields including name, description, payment type, starting ticket number, weighing method, and weight units. The virtual kiosk may be configured to operate in a single login mode (e.g., for a virtual tablet kiosk) and/or include unlimited pre-ticket weighment. Unlimited pre-ticketed re-weighments may comprise configuring a virtual kiosk such that a driver can reweigh their truck as often as they like and have a weigh ticket generated when the driver indicates completion, e.g., selects a done button.

An inbound/outbound weighing method may also be configured for a virtual kiosk such that the driver user can specify whether a truck is inbound or outbound or determined based on inbound and outbound weights. For example, the virtual kiosk may determine a tare weight and a gross weight from truck weighings. Specifically, the lower of the two weights may be determined as the tare weight and the higher may be the gross weight.

Figure 35:
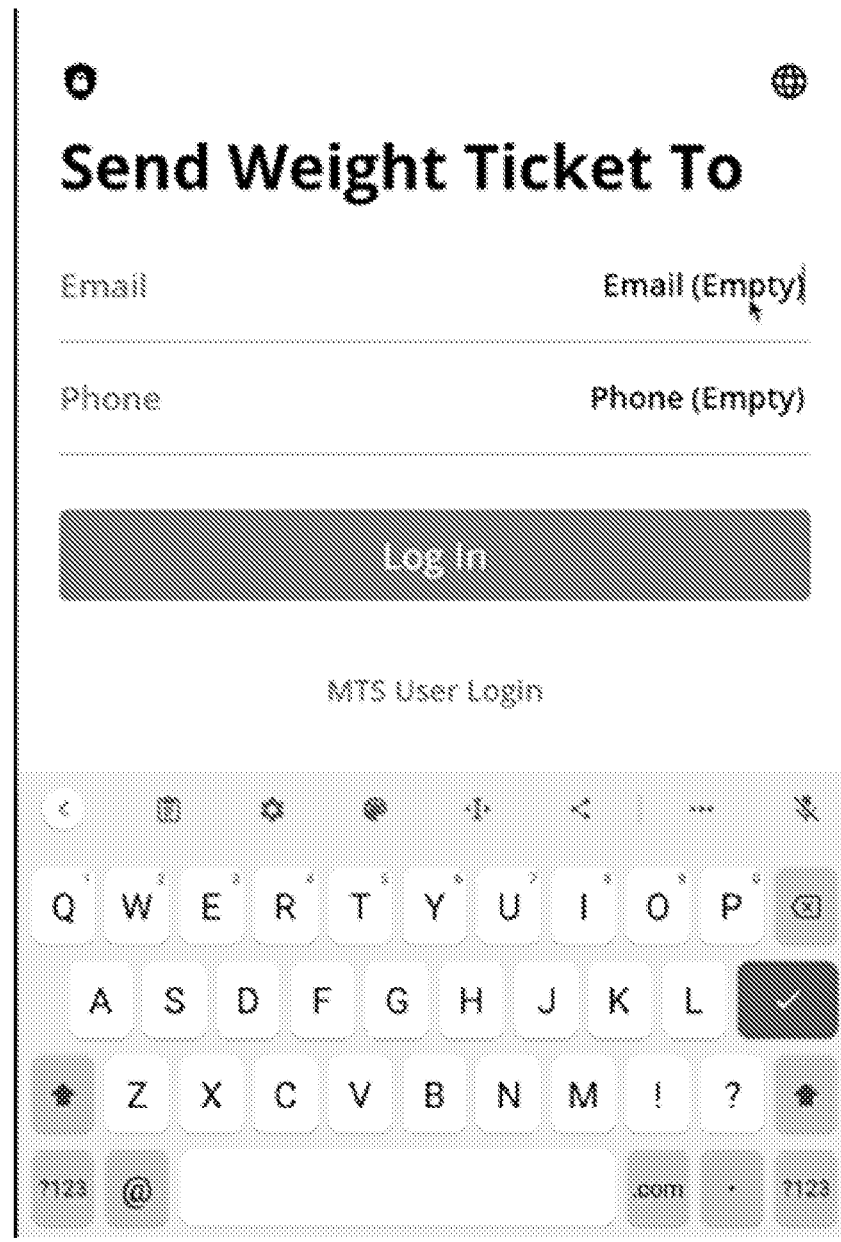

FIGS. 35 through 46 present exemplary screen interfaces for inbound/outbound weighing according to an embodiment of the present invention. A computing device may be provided at a weighing site for accessing a scale device. The computing device may execute an application including e.g., a virtual tablet kiosk configured in a single login mode. As illustrated in FIG. 35, the virtual tablet kiosk presents a guest login interface that solicits for an email address and/or phone number from a driver.

Figure 36:
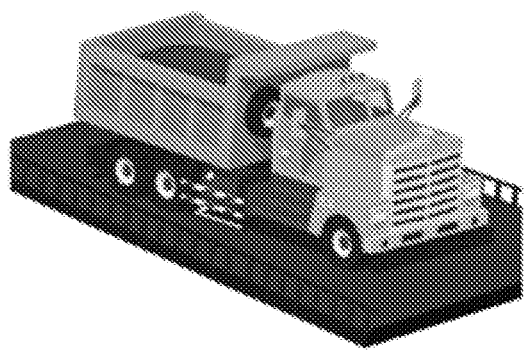
Figure 37:
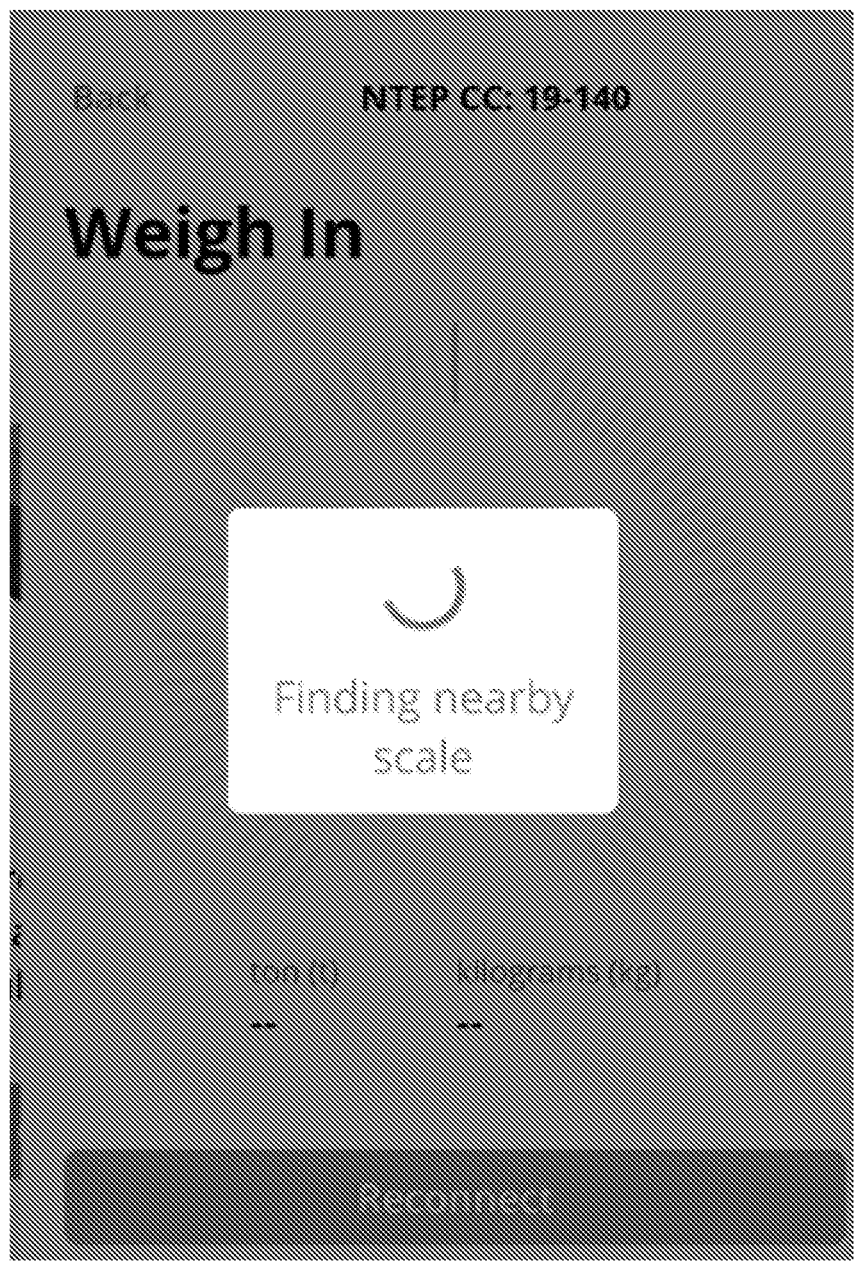
Figure 38:
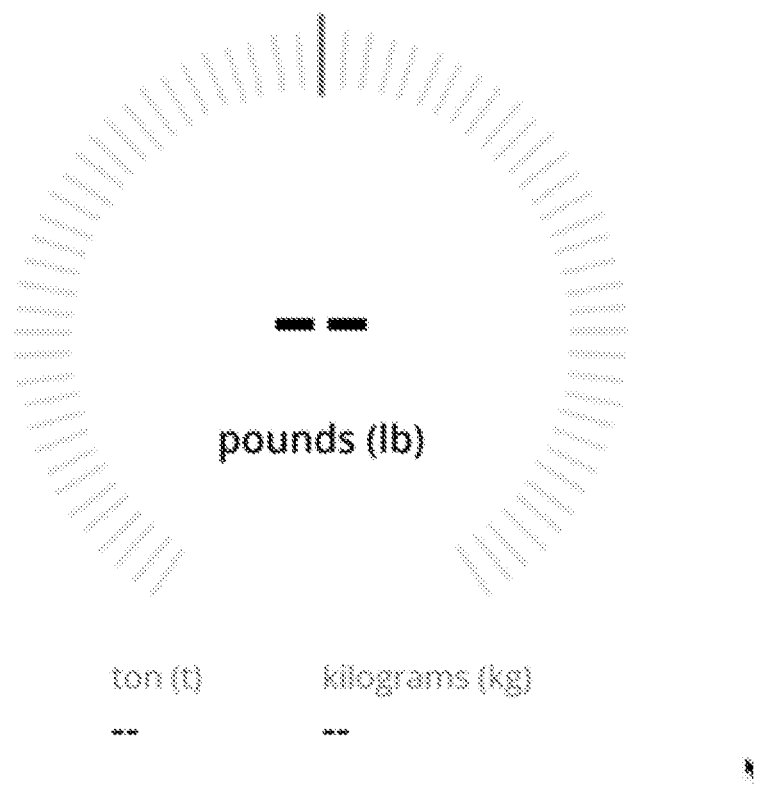
Figure 39:

Upon an email address and/or phone number, the virtual tablet kiosk instructs the driver to position their truck on the scale device and provides a button to connect to the scale device to weigh the truck (FIG. 36). The virtual tablet kiosk may identify and connect to a nearby scale device (FIG. 37). Once connected to a scale device, the driver may proceed to initiate weighment, FIGS. 38 and 39.

Figure 40:
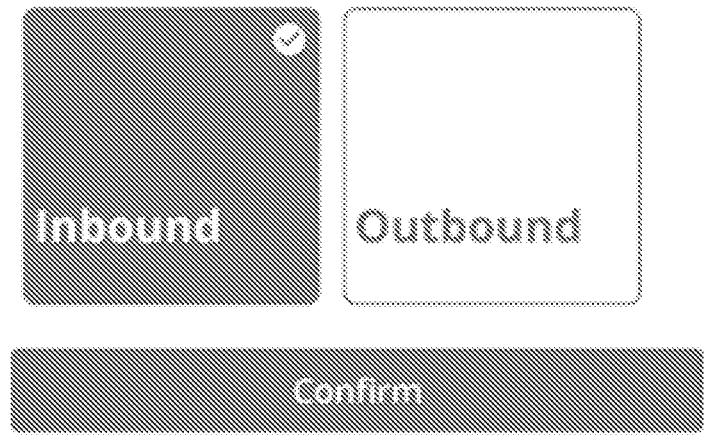

As shown in FIG. 40, the driver may specify that the current weighment session comprises an inbound weighing. The virtual tablet kiosk generates an overview (FIG. 41) of the inbound weighing including weight information (e.g., gross, tare, net, inbound, and outbound), weighment date, and weighment time. The virtual tablet kiosk also confirms success of the inbound weighing and displays a weighing summary (FIG. 42).

Figure 43:
Figure 44:
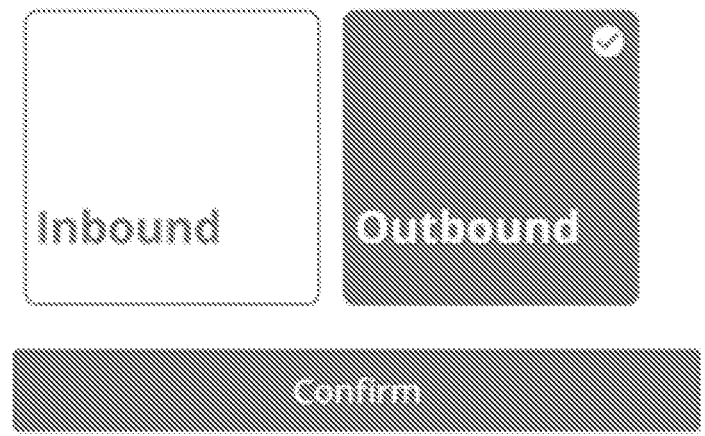
Figure 45:
Figure 46:

The workflow illustrated in FIGS. 35 through 37 may be repeated for outbound weighing. FIG. 43 presents an interface for initiating the outbound weighment. The driver may then proceed to confirm that the current weighment session comprises an outbound weighing (FIG. 44). The virtual tablet kiosk generates an overview (FIG. 45) of the outbound weighing including weight information (e.g., gross, tare, net, inbound, and outbound), weighment date, and weighment time. The virtual tablet kiosk may determine a gross weight from the heavier of the inbound and outbound weights. Conversely, the virtual tablet kiosk may determine a tare weight from the lighter of the inbound and outbound weights. The virtual tablet kiosk may also then determine a net weight (e.g., of a cargo load) based on a difference of the inbound and outbound weights. The virtual tablet kiosk also confirms success of the outbound weighing and displays a weighing summary (FIG. 46).

FIGS. 1 through 46 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine-readable medium as part of a computer program product and is loaded into a computer system or other device or machine via a removable storage drive, hard drive, or communications interface. Computer programs (also called computer control logic or computer-readable program code) are stored in a main and/or secondary memory, and executed by one or more processors (controllers, or the like) to cause the one or more processors to perform the functions of the invention as described herein. In this document, the terms "machine readable medium," "computer-readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A truck scale management system comprising at least one processing device comprising a processor and memory having executable instructions stored thereon that when executed by the processor cause the processor to:
   connect to a truck scale system via a self-driving or remotely controlled vehicle, the truck scale system comprising a virtual scale that corresponds to and comprises a software representation of a physical truck scale, wherein one or more attributes including hardware specifications, parameters, and functionality of the physical truck scale are displayed via the virtual scale;
   use the virtual scale to execute, by a self-driving system of the self-driving or remotely controlled vehicle, a weighment operation by the physical truck scale on the self-driving or remotely controlled vehicle using the one or more attributes of the physical truck scale, wherein the virtual scale is accessed and controlled by the self-driving or remotely controlled vehicle to set the parameters of the physical truck scale and utilize the functionality of the physical truck scale; and
   obtain, from the virtual scale, data corresponding to the weighment operation.

2. The truck scale management system of claim 1, wherein the truck scale management system comprises a server including a processor and memory having executable instructions stored thereon that when executed by the processor cause the processor to connect to the truck scale system through an application programming interface from the self-driving or remotely controlled vehicle.

3. The truck scale management system of claim 1, wherein the truck scale management system comprises a client device comprising a server including a processor and memory having executable instructions stored thereon that when executed by the processor cause the processor to select from a database a virtual kiosk configured to be loaded onto the client device and to facilitate communication between the client device and the truck scale system.

4. The truck scale management system of claim 3, wherein the selected virtual kiosk corresponds to the virtual scale, and wherein the virtual kiosk is configured to use the virtual scale to execute the weighment operation by the physical truck scale on the self-driving or remotely controlled vehicle using the one or more attributes of the physical truck scale, obtain data corresponding to the weighment operation, and parse the data for display on the client device.

5. The truck scale management system of claim 3, wherein the virtual kiosk comprises a payable kiosk configured to:
   receive a list of materials, prices associated with receiving the materials, and weight units for the materials; and
   generate a price to be paid for receiving the materials.

6. The truck scale management system of claim 3, wherein the virtual kiosk is configured to use the virtual scale to execute inbound/outbound weighment operations using the one or more attributes of the physical truck scale.

7. The truck scale management system of claim 1, wherein the truck scale management system comprises a tablet kiosk device comprising a server including a processor and memory having executable instructions stored thereon that when executed by the processor cause the processor to select from a database a virtual tablet kiosk communicatively accessible by the tablet kiosk device via a single login mode using messaging communication, and wherein the selected virtual table kiosk is configured to be loaded onto the tablet kiosk device and to facilitate communication between the tablet kiosk device and the truck scale system.

8. The truck scale management system of claim 7, wherein the selected virtual tablet kiosk corresponds to the virtual scale, and wherein the virtual tablet kiosk is configured to use the virtual scale to execute the weighment operation by the physical truck scale on the self-driving or remotely controlled vehicle using the one or more attributes of the physical truck scale based on messaging communication information, obtain data corresponding to the weighment operation, parse the data for display on the tablet kiosk device, and send weighment tickets using the messaging communication information.

9. The truck scale management system of claim 1, wherein the virtual scale is configured to define weighing capability, behavior of the physical truck scale, and formatting of data corresponding to the weighment operation.

10. The truck scale management system of claim 1, wherein the connection to the truck scale system via the self-driving or remotely controlled vehicle is based at least in part on a proximity of the self-driving or remotely controlled vehicle to the physical truck scale.

11. The truck scale management system of claim 1, wherein the data corresponding to the weighment operation comprises one or more of: weight data, weight units data, and a motion flag.

12. The truck scale management system of claim 1, wherein the data corresponding to the weighment operation comprises axle weights comprising one or more of: a steer weight, a drive weight, and a trailer weight.

13. The truck scale management system of claim 1, wherein the truck scale system is configured to operate in an autonomous manner without further human input.

14. The truck scale management system of claim 1, wherein the truck scale system is configured to operate in an autonomous manner based on an instruction provided by the processor.

15. The truck scale management system of claim 1, wherein the truck scale system is configured to operate in an autonomous manner based on an instruction provided by a self-driving system on the self-driving or remotely controlled vehicle.

16. The truck scale management system of claim 1, wherein the truck scale system is configured to operate in a semi-autonomous manner based at least in part on an instruction provided by the processor and on human input from within a vicinity of the truck scale system or remotely.

17. The truck scale management system of claim 1, wherein the truck scale system is configured to operate in a manual manner based on human input.

18. The truck scale management system of claim 1, wherein the weighment operation comprises unlimited pre-ticketed re-weighments.

19. A method, in a data processing system comprising a processor and memory, for managing truck scale systems, the method comprising:
connecting to a truck scale system via a self-driving or remotely controlled vehicle, the truck scale system comprising a virtual scale that corresponds to and comprises a software representation of a physical truck scale, wherein one or more attributes including one or more attributes including hardware specifications, parameters, and functionality of the physical truck scale are displayed via the virtual scale;
using the virtual scale to execute, by a self-driving system of the self-driving or remotely controlled vehicle, a weighment operation by the physical truck scale on the self-driving or remotely controlled vehicle using the one or more attributes of the physical truck scale, wherein the virtual scale is accessed and controlled by the self-driving or remotely controlled vehicle to set the parameters of the physical truck scale and utilize the functionality of the physical truck scale; and
obtaining, from the virtual scale, data corresponding to the weighment operation.

20. Non-transitory computer-readable media comprising program code that when executed by a programmable processor causes execution of a method for managing truck scale systems, the computer-readable media comprising:
computer program code for connecting to a truck scale system via a self-driving or remotely controlled vehicle, the truck scale system comprising a virtual scale that corresponds to and comprises a software representation of a physical truck scale, wherein hardware specifications, parameters, and functionality of the physical truck scale are displayed via the virtual scale;
computer program code for using the virtual scale to execute, by a self-driving system of the self-driving or remotely controlled vehicle, a weighment operation by the physical truck scale on the self-driving or remotely controlled vehicle using the one or more attributes of the physical truck scale, wherein the virtual scale is accessed and controlled by the self-driving or remotely controlled vehicle to set the parameters of the physical truck scale and utilize the functionality of the physical truck scale; and
computer program code for obtaining, from the virtual scale, data corresponding to the weighment operation.

* * * * *